(12) United States Patent
Tabata et al.

(10) Patent No.: US 11,440,531 B2
(45) Date of Patent: Sep. 13, 2022

(54) CONTROL DEVICE FOR HYBRID VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Tooru Matsubara, Toyota (JP); Yasuhiro Hiasa, Miyoshi (JP); Yasutaka Tsuchida, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 265 days.

(21) Appl. No.: 16/898,413

(22) Filed: Jun. 10, 2020

(65) Prior Publication Data
US 2021/0031745 A1    Feb. 4, 2021

(30) Foreign Application Priority Data

Jul. 29, 2019  (JP) .............................. JP2019-139242

(51) Int. Cl.
| | |
|---|---|
| *B60W 20/15* | (2016.01) |
| *B60K 6/24* | (2007.10) |
| *B60K 6/36* | (2007.10) |
| *F02B 37/12* | (2006.01) |
| *F02D 41/14* | (2006.01) |

(52) U.S. Cl.
CPC .............. *B60W 20/15* (2016.01); *B60K 6/24* (2013.01); *B60K 6/36* (2013.01); *F02B 37/12* (2013.01); *B60W 2510/0633* (2013.01); *B60W 2710/0644* (2013.01); *B60W 2710/083* (2013.01); *B60Y 2200/92* (2013.01); *B60Y 2400/435* (2013.01); *F02D 2041/1436* (2013.01)

(58) Field of Classification Search
None
See application file for complete search history.

(56) References Cited

U.S. PATENT DOCUMENTS

| | | | |
|---|---|---|---|
| 6,278,195 B1 | 8/2001 | Yamaguchi et al. | |
| 7,104,347 B2* | 9/2006 | Severinsky | F02B 37/16 180/65.23 |
| 8,052,570 B2* | 11/2011 | Kumazaki | B60W 10/06 477/4 |
| 8,447,501 B2* | 5/2013 | Gamberoni | F02N 11/0829 701/110 |
| 10,012,169 B2* | 7/2018 | Rueger | F02M 26/06 |

(Continued)

FOREIGN PATENT DOCUMENTS

| | | | |
|---|---|---|---|
| JP | H0942003 A | * | 2/1997 |
| JP | H10-306739 A | | 11/1998 |

(Continued)

*Primary Examiner* — Dirk Wright

(74) *Attorney, Agent, or Firm* — Hunton Andrews Kurth LLP

(57) ABSTRACT

An MG1 torque at a time of decreasing an engine speed of an engine is made larger when a turbocharging pressure by a turbocharger is higher than when the turbocharging pressure is lower. In this way, even if the losses of pumps of the engine differ due to the remaining turbocharging pressure during a transition of stopping the engine in turbocharging, it is possible to appropriately reduce the engine speed. Therefore, when the engine is being brought to a stop, it is possible to appropriately suppress vibration generated in the vehicle.

7 Claims, 10 Drawing Sheets

(56) References Cited

U.S. PATENT DOCUMENTS

| | | | |
|---|---|---|---|
| 10,029,688 B2 * | 7/2018 | Khafagy | B60W 30/18036 |
| 10,272,909 B1 * | 4/2019 | Melatti | B60W 30/182 |
| 2021/0086751 A1 * | 3/2021 | Tabata | B60K 6/24 |

FOREIGN PATENT DOCUMENTS

| | | | |
|---|---|---|---|
| JP | H1182088 A | * | 3/1999 |
| JP | 2015190379 A | * | 11/2015 |

* cited by examiner

| TRAVELING MODE | | | | C1 | B1 | MG1 | MG2 |
|---|---|---|---|---|---|---|---|
| EV | FORWARD /BACKWARD | SINGLE DRIVE | DRIVE | | | G | M |
| | | | WITH ENGINE BRAKE | △ | △ | G | M |
| | | DUAL DRIVE | | ○ | ○ | M | M |
| HV | FORWARD | HIGH | | | ○ | G | M |
| | | LOW | | ○ | | G | M |
| | BACKWARD | LOW | | ○ | | G | M |

FIG. 13

| AT GEAR STAGE | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

CONTROL DEVICE FOR HYBRID VEHICLE

CROSS-REFERENCE TO RELATED APPLICATION

This application claims priority to Japanese Patent Application No. 2019-139242 filed on Jul. 29, 2019, incorporated herein by reference in its entirety.

BACKGROUND

1. Technical Field

The disclosure relates to a control device for a hybrid vehicle including an engine with a turbocharger and a rotating machine.

2. Description of Related Art

A control device for a hybrid vehicle is well known which includes an engine and a rotating machine capable of adjusting the engine speed of the engine. For example, the above vehicle is disclosed in Japanese Unexamined Patent Application Publication No. 10-306739 (JP 10-306739 A). In JP 10-306739 A, it is disclosed that, when a signal for stopping the operation of an engine is output, the fuel injection to the engine is stopped and the output torque of a rotating machine is controlled such that the engine speed of the engine is reduced faster than a natural change to quickly pass through a rotation speed region where a resonance phenomenon of a power transmission system is likely to occur.

SUMMARY

However, when the engine has a turbocharger, the turbocharging pressure remains during the transition to a stop of the engine in turbocharging. In this case, since the losses of pumps of the engine differ due to the remaining turbocharging pressure, the engine speed of the engine cannot be properly reduced with the uniformly controlled output torque of the rotating machine. Therefore, there is a possibility that vibration generated in vehicle due to passing through the rotation speed region where the resonance phenomenon is likely to occur cannot be appropriately suppressed.

The disclosure has been made in view of the above circumstances, and an object of the present disclosure is to provide a control device for a hybrid vehicle capable of appropriately suppressing vibration generated in the vehicle while an engine is coming to a stop.

An aspect of the disclosure relates to a control device for a hybrid vehicle including (a) an engine with a turbocharger and a rotating machine that is able to adjust an engine speed of the engine, (b) the control device including an engine stop controller configured to stop fuel supply to the engine and control an output torque of the rotating machine to apply a torque for reducing the engine speed of the engine to the engine, when the engine is being brought to a stop, and (c) the engine stop controller is configured to make the output torque of the rotating machine at a time of decreasing the engine speed of the engine larger when a turbocharging pressure by the turbocharger is higher than when the turbocharging pressure is lower.

In the control device according to the aspect of the disclosure, the engine stop controller may be configured to make larger the output torque of the rotating machine at the time of decreasing the engine speed of the engine as the turbocharging pressure increases.

In the control device according to the aspect of the disclosure, the engine stop controller may be configured to, at the time of decreasing the engine speed of the engine, control the output torque of the rotating machine based on a feedback control amount by feedback control that controls the output torque of the rotating machine such that the engine speed of the engine becomes a target engine speed gradually reducing toward zero, and a feedforward control amount of the output torque of the rotating machine that is made larger when the turbocharging pressure is higher than the turbocharging pressure is lower.

In the control device according to the aspect of the disclosure, the engine stop controller may be configured to correct a feedback gain in the feedback control by learning control based on a deviation between a value of a stop transition time at a current control and a target value of the stop transition time to make a value of the stop transition time at a next control close to the target value, in which the stop transition time is a time from a starting time point of a control for stopping the engine to a time point when the engine is stopped.

In the control device according to the aspect of the disclosure, the engine stop controller may be configured to correct the feedforward control amount by learning control based on a deviation between a value of a stop transition time at a current control and a target value of the stop transition time to make a value of the stop transition time at a next control close to the target value, in which the stop transition time is a time from a starting time point of a control for stopping the engine to a time point when the engine is stopped.

In the control device according to the aspect of the disclosure, the engine stop controller may be configured to estimate the turbocharging pressure when the engine is being brought to a stop, based on a detection value obtained by a sensor that detects the turbocharging pressure obtained at a starting time point of a control for stopping the engine and an elapsed time from the starting time point of the control for stopping the engine.

In the control device according to the aspect of the disclosure, the hybrid vehicle includes a differential mechanism that splits power of the engine to transmit the power to drive wheels and the rotating machine.

According to the aspect of the disclosure, the output torque of the rotating machine is controlled such that the supply of fuel to the engine is stopped and a torque for reducing the engine speed of the engine is applied to the engine, when the engine is being brought to a stop, and the output torque of the rotating machine at the time of decreasing the engine speed of the engine is made larger when the turbocharging pressure by the turbocharger is higher than when the turbocharging pressure is lower. Therefore, even if the pump losses of the engine differ due to the turbocharging pressure remaining during the transition to stop the engine in turbocharging, it is possible to appropriately reduce the engine speed of the engine. As a result, when the engine is being brought to a stop, it is possible to appropriately suppress vibration generated in the vehicle.

According to the aspect of the disclosure, since the output torque of the rotating machine at the time of decreasing the engine speed of the engine is made larger as the turbocharging pressure increases, it is possible to reduce the engine speed of the engine more appropriately during the transition to stop the engine in turbocharging.

Further, according to the aspect of the disclosure, at the time of decreasing the engine speed of the engine, the output torque of the rotating machine is controlled based on the feedback control amount of the feedback control that controls the output torque of the rotating machine such that the engine speed of the engine becomes the target engine speed gradually reducing toward zero, and the feedforward control amount of the output torque of the rotating machine that is made larger when the turbocharging pressure is higher than when the turbocharging pressure is lower. In this way, it is possible to appropriately control the output torque of the rotating machine at the time of decreasing the engine speed of the engine.

Further, according to the aspect of the disclosure, the feedback gain in the feedback control is corrected by learning control based on the deviation between the value of the stop transition time at the current control and the target value to make the value of the stop transition time when the engine is stopped at the next control close to the target value. In this way, it is possible to appropriately reduce the engine speed of the engine such that the stop transition time becomes the target value.

Further, according to the aspect of the disclosure, the feedforward control amount is corrected by learning control based on the deviation between the value of the stop transition time at the current control and the target value to make the value of the stop transition time when the engine is stopped at the next control close to the target value. In this way, it is possible to appropriately reduce the engine speed of the engine such that the stop transition time becomes the target value.

Further, according to the aspect of the disclosure, the turbocharging pressure when the engine is being brought to a stop is estimated based on a detection value obtained by a sensor that detects the turbocharging pressure obtained at a starting time point of a control for stopping the engine and an elapsed time from the starting time point of the control for stopping the engine. In this way, for example, even when the value detected by the sensor cannot be used in a low turbocharging pressure range due to the decrease in sensor accuracy, it is possible to control the output torque of the rotating machine at the time of decreasing the engine speed of the engine according to the turbocharging pressure.

Further, according to the aspect of the disclosure, in the hybrid vehicle including the engine with the turbocharger and the differential mechanism that splits power of the engine to transmit the power to drive wheels and the rotating machine, it is possible to appropriately suppress vibration generated in the vehicle when the engine is being brought to a stop.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 13 is an operation chart illustrating a relationship between a shift operation of a mechanical stepped transmission unit illustrated in FIG. 12 and an operation combination of engagement devices used therefor.

DETAILED DESCRIPTION OF EMBODIMENTS

Hereinafter, embodiments of the disclosure will be described in detail with reference to the drawings.

Figure 1:
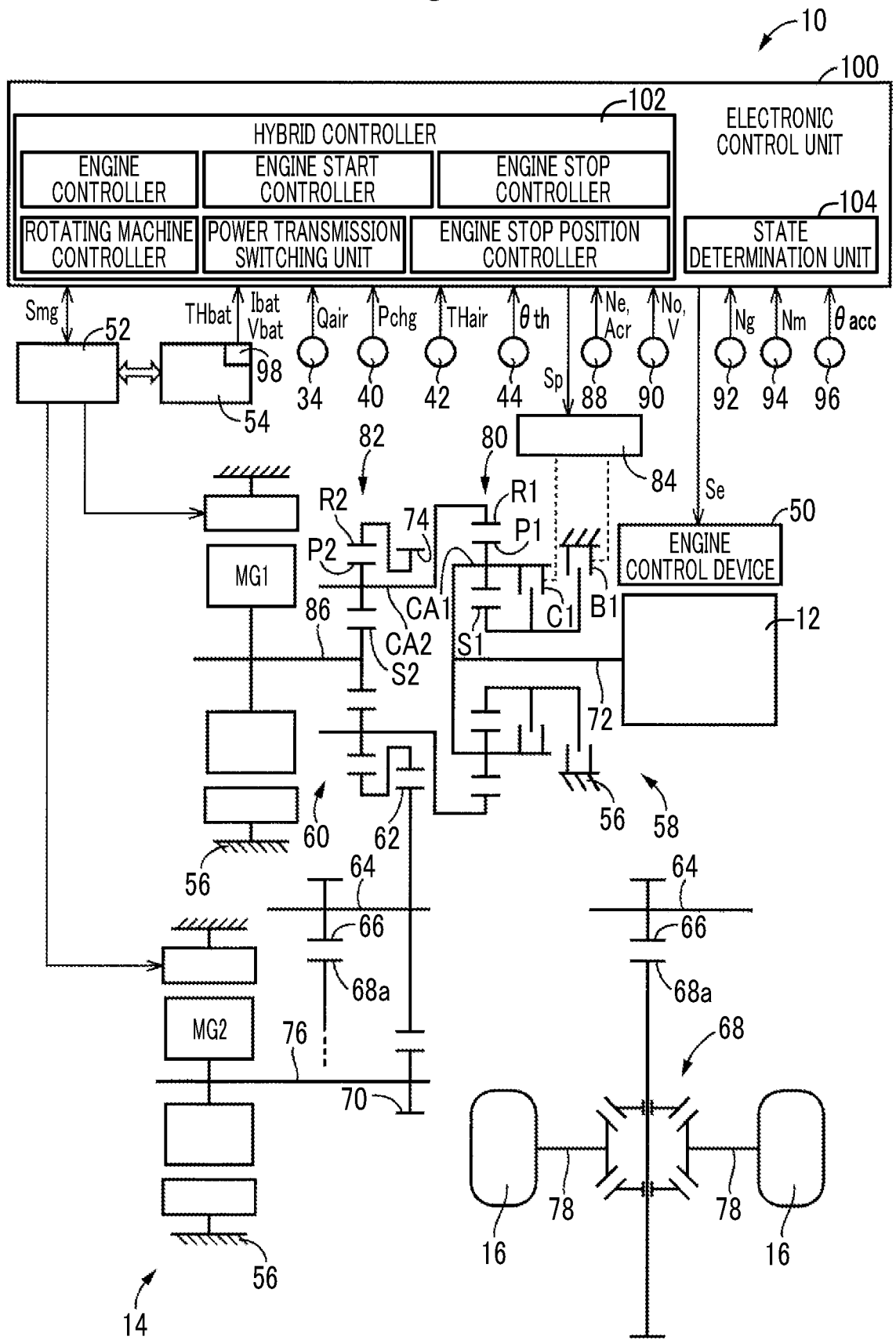
FIG. 1 is a diagram illustrating a schematic configuration of a vehicle to which the present disclosure is applied, and illustrating a main part of a control function and a control system for various controls in the vehicle.

FIG. 1 is a diagram illustrating a schematic configuration of a vehicle 10 to which the present disclosure is applied, and illustrating a main part of a control function and a control system for various controls in the vehicle 10. In FIG. 1, the vehicle 10 is a hybrid vehicle including an engine 12, a first rotating machine MG1, a second rotating machine MG2, a power transmission device 14, and drive wheels 16.

Figure 2:
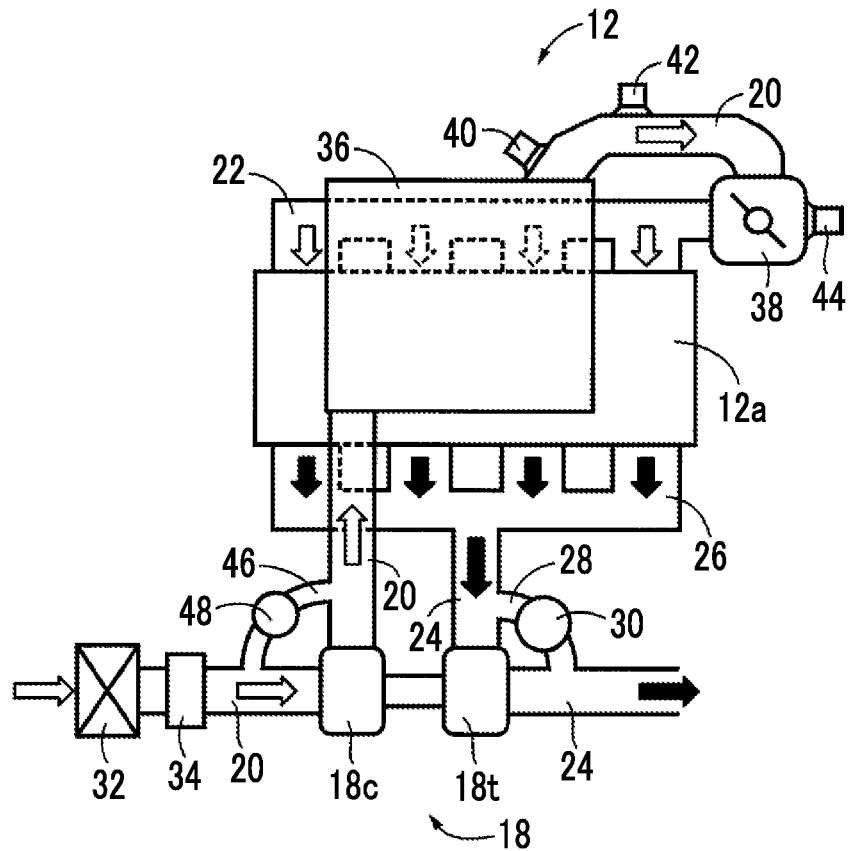
FIG. 2 is a diagram illustrating a schematic configuration of an engine.

FIG. 2 is a diagram illustrating a schematic configuration of the engine 12. In FIG. 2, an engine 12 is a power source for causing the vehicle 10 to travel and is a known internal combustion engine such as a gasoline engine or a diesel engine having a turbocharger 18, that is, an engine with a turbocharger 18. An intake pipe 20 is provided in an intake system of the engine 12, and the intake pipe 20 is connected to an intake manifold 22 attached to an engine main body 12a. An exhaust pipe 24 is provided in an exhaust system of the engine 12, and the exhaust pipe 24 is connected to an exhaust manifold 26 attached to the engine main body 12a. The turbocharger 18 is a known exhaust turbine type turbocharger, that is, a turbocharger having a compressor 18c provided in the intake pipe 20 and a turbine 18t provided in the exhaust pipe 24. The turbine 18t is driven to rotate by the flow of discharging gas, that is, exhaust gas. The compressor 18c is connected to the turbine 18t, and compresses sucking air for the engine 12, that is, intake air, by being rotationally driven by the turbine 18t.

The exhaust pipe 24 is provided in parallel with an exhaust bypass 28 for bypassing the turbine 18t to flow exhaust gas from upstream to downstream of the turbine 18t. The exhaust bypass 28 is provided with a wastegate valve (WGV) 30 for continuously controlling the ratio between the exhaust gas passing through the turbine 18t and the exhaust gas passing through the exhaust bypass 28. The valve opening degree of the wastegate valve 30 is continuously adjusted by operating an actuator (not shown) by an electronic control unit 100 to be described later. The larger the valve opening degree of the wastegate valve 30 is, the more easily the exhaust gas of the engine 12 is discharged through the exhaust bypass 28. Therefore, in the turbocharging state of the engine 12 in which the turbocharging operation of the turbocharger 18 is effective, the turbocharging pressure Pchg by the turbocharger 18 decreases as the valve opening degree of the wastegate valve 30 increases. The turbocharging pressure Pchg by the turbocharger 18 is the pressure of the intake air, and is the air pressure downstream of the compressor 18c in the intake pipe 20. The low part of the turbocharging pressure Pchg is, for example, the part representing the intake pressure in the non-turbocharging state of the engine 12 in which the turbocharging operation of the turbocharger 18 is not effective at all, in other words, the part representing the pressure of intake air in the engine without the turbocharger 18.

An air cleaner 32 is provided at an inlet of the intake pipe 20, and an air flow meter 34 for measuring an intake air amount Qair of the engine 12 is provided in the intake pipe 20 downstream of the air cleaner 32 and upstream of the compressor 18c. An intercooler 36, which is a heat exchanger for cooling intake air compressed by the turbocharger 18 by performing heat exchange between the intake air and outside air or coolant, is provided in the intake pipe 20 downstream of the compressor 18c. An electronic throttle valve 38, which is controlled to be opened and closed by operating a throttle actuator (not shown) by an electronic control unit 100 to be described later, is provided in the intake pipe 20 downstream of the intercooler 36 and upstream of the intake manifold 22. In the intake pipe 20 between the intercooler 36 and the electronic throttle valve 38, a turbocharging pressure sensor 40 for detecting a turbocharging pressure Pchg by the turbocharger 18 and an intake air temperature sensor 42 for detecting an intake air temperature THair which is the temperature of the intake air are provided. In the vicinity of the electronic throttle valve 38, for example, in a throttle actuator, a throttle valve opening degree sensor 44 for detecting a throttle valve opening degree θth, which is an opening degree of the electronic throttle valve 38, is provided.

In the intake pipe 20, an air recirculation bypass 46 for bypassing the compressor 18c from downstream to upstream of the compressor 18c to recirculate air is provided in parallel. In the air recirculation bypass 46, for example, an air bypass valve (ABV) 48 is provided that is opened when the electronic throttle valve 38 is suddenly closed to suppress generation of surge and protect the compressor 18c.

In the engine 12, an engine control device 50 (refer to FIG. 1) including an electronic throttle valve 38, a fuel injection device, an ignition device, a wastegate valve 30, and the like, is controlled by the electronic control unit 100 to be described later, which, in turn, the engine torque Te, which is the output torque of the engine 12, is controlled.

Returning to FIG. 1, the first rotating machine MG1 and the second rotating machine MG2 are rotating electric machines having a function as an electric motor (motor) and a function as a generator, and are so-called motor generators. The first rotating machine MG1 and the second rotating machine MG2 can be power sources for the vehicle 10 to travel. Each of the first rotating machine MG1 and the second rotating machine MG2 is connected to a battery 54 provided in the vehicle 10 through an inverter 52 provided in the vehicle 10. In the first rotating machine MG1 and the second rotating machine MG2, an MG1 torque Tg, which is the output torque of the first rotating machine MG1, and an MG2 torque Tm, which is the output torque of the second rotating machine MG2 are controlled, respectively, by controlling the inverter 52 by the electronic control unit 100, which will be described later. For example, in the case of positive rotation, the output torque of the rotating machine is a powering torque at a positive torque during accelerating, and a regenerative torque at a negative torque during decelerating. The battery 54 is a power storage device that exchanges electric power with each of first rotating machine MG1 and second rotating machine MG2. The first rotating machine MG1 and the second rotating machine MG2 are provided in a case 56, which is a non-rotating member attached to the vehicle body.

The power transmission device 14 includes a transmission unit 58, a differential unit 60, a driven gear 62, a driven shaft 64, a final gear 66, a differential gear 68, a reduction gear 70, and the like, in a case 56. The transmission unit 58 and the differential unit 60 are arranged coaxially with an input shaft 72, which is an input rotating member of the transmission unit 58. The transmission unit 58 is connected to the engine 12 through an input shaft 72 or the like. The differential unit 60 is connected in series with the transmission unit 58. The driven gear 62 meshes with a drive gear 74, which is an output rotating member of the differential unit 60. The driven shaft 64 fixes the driven gear 62 and the final gear 66 such that the driven gear 62 and the final gear 66 cannot rotate relative to each other. The final gear 66 has a smaller diameter than the driven gear 62. The differential gear 68 meshes with the final gear 66 through a differential ring gear 68a. The reduction gear 70 has a smaller diameter than the driven gear 62 and meshes with the driven gear 62. The reduction gear 70 is connected to the rotor shaft 76 of the second rotating machine MG2, which is disposed in parallel with the input shaft 72 separately from the input shaft 72, and is connected to the second rotating machine MG2 to transmit power. In addition, the power transmission device 14 includes an axle 78 connected to the differential gear 68, and the like.

The power transmission device 14 configured as described above is suitably used for a front engine front drive (FF) type or rear engine rear drive (RR) type vehicle. In the power transmission device 14, the power output from each of the engine 12, the first rotating machine MG1, and the second rotating machine MG2 is transmitted to the driven gear 62, and from the driven gear 62, the power is transmitted to the drive wheels 16 sequentially through the final gear 66, the differential gear 68, the axle 78 and the like. Thus, the second rotating machine MG2 is a rotating machine connected to the drive wheels 16 to transmit power. In the power transmission device 14, the engine 12, the transmission unit 58, the differential unit 60, and the first rotating machine MG1 are arranged on the different axis from the second rotating machine MG2, and thus the shaft length is reduced. Further, it is possible to increase the reduction ratio of the second rotating machine MG2. In addition, unless otherwise distinguished, power includes torque and force in terms of its meaning.

The transmission unit 58 includes a first planetary gear mechanism 80, a clutch C1, and a brake B1. The differential unit 60 includes a second planetary gear mechanism 82. The first planetary gear mechanism 80 is a known single pinion type planetary gear device including a first sun gear S1, a first pinion P1, a first carrier CA1 that rotatably and revolvably supports the first pinion P1, and a first ring gear R1 that meshes with the first sun gear S1 through the first pinion P1. The second planetary gear mechanism 82 is a known single pinion type planetary gear device including a second sun gear S2, a second pinion P2, a second carrier CA2 that rotatably and revolvably supports the second pinion P2, and a second ring gear R2 that meshes with the second sun gear S2 through the second pinion P2.

In the first planetary gear mechanism 80, the first carrier CA1 is a rotating element which is integrally connected to the input shaft 72, and to which the engine 12 is connected through the input shaft 72 to transmit power. The first sun gear S1 is a rotating element selectively connected to the case 56 through the brake B1. The first ring gear R1 is a rotating element connected to the second carrier CA2 of the second planetary gear mechanism 82, which is an input rotating member of the differential unit 60, and functions as an output rotating member of the transmission unit 58. Further, the first carrier CA1 and the first sun gear S1 are selectively connected through a clutch C1.

Each of the clutch C1 and the brake B1 is a wet frictional engagement device, and is a multi-plate hydraulic frictional engagement device where the engagement is controlled by a hydraulic actuator. With a hydraulic control circuit 84 provided in the vehicle 10 being controlled by an electronic control unit 100, which will be described later, operation states of the clutch C1 and the brake B1, such as engagement and release, are switched according to regulated hydraulic pressures Pc1 and Pb1 output from the hydraulic control circuit 84, respectively.

In a state where both the clutch C1 and the brake B1 are released, the differential of the first planetary gear mechanism 80 is allowed. Accordingly, in this state, since the reaction torque of the engine torque Te cannot be obtained in the first sun gear S1, the transmission unit 58 is in a neutral state in which mechanical power cannot be transmitted, that is, in a neutral state. In a state in which the clutch C1 is engaged and the brake B1 is released, the first planetary gear mechanism 80 has the rotating elements integrally rotated. Therefore, in this state, the rotation of the engine 12 is transmitted at a constant speed from the first ring gear R1 to the second carrier CA2. On the other hand, in a state where the clutch C1 is released and the brake B1 is engaged, in the first planetary gear mechanism 80, the rotation of the first sun gear S1 is stopped, and the rotation of the first ring gear R1 is faster than the rotation of the first carrier CA1. Therefore, in this state, the rotation of the engine 12 is accelerated and output from the first ring gear R1. As described above, the transmission unit 58 functions as a two-stage stepped transmission that allows the switching between a low gear with a gear ratio of "1.0", meaning a direct coupled condition, and a high gear with a gear ratio of "0.7", meaning an overdrive condition, for example. When the clutch C1 and the brake B1 are both engaged, the rotation of each rotating element of the first planetary gear mechanism 80 is stopped. Accordingly, in this state, the rotation of the first ring gear R1, which is the output rotating member of the transmission unit 58, is stopped, and thus the rotation of the second carrier CA2, which is the input rotating member of the differential unit 60, is stopped.

In the second planetary gear mechanism 82, the second carrier CA2 is a rotating element connected to the first ring gear R1, which is an output rotating member of the transmission unit 58, and functions as an input rotating member of the differential unit 60. The second sun gear S2 is integrally connected to the rotor shaft 86 of the first rotating machine MG1, and is a rotating element to which the first rotating machine MG1 is connected to transmit power. The second ring gear R2 is integrally connected to the drive gear 74, is a rotating element connected to the drive wheels 16 to transmit power, and functions as an output rotating member of the differential unit 60. The second planetary gear mechanism 82 is a power split device mechanically splitting the power of the engine 12 to be input to the second carrier CA2 through the transmission unit 58 into the first rotating machine MG1 and the drive gear 74. That is, the second planetary gear mechanism 82 is a differential mechanism splitting the power of the engine 12 into the drive wheels 16 and the first rotating machine MG1 to transmit the split power. In the second planetary gear mechanism 82, the second carrier CA2 functions as an input element, the second sun gear S2 functions as a reaction element, and the second ring gear R2 functions as an output element. The differential unit 60 forms, together with the first rotating machine MG1 which is connected to the second planetary gear mechanism 82 to transmit power, an electric transmission mechanism for controlling the differential state of the second planetary gear mechanism 82 by controlling the operation state of the first rotating machine MG1, for example, an electric continuously variable transmission. The first rotating machine MG1 is a rotating machine to which the power of the engine 12 is transmitted. Since the transmission unit 58 is overdriven, the increase in the torque of the first rotating machine MG1 is suppressed. It is to be noted that controlling the operation state of the first rotating machine MG1 means performing operation control of the first rotating machine MG1.

Figure 3:
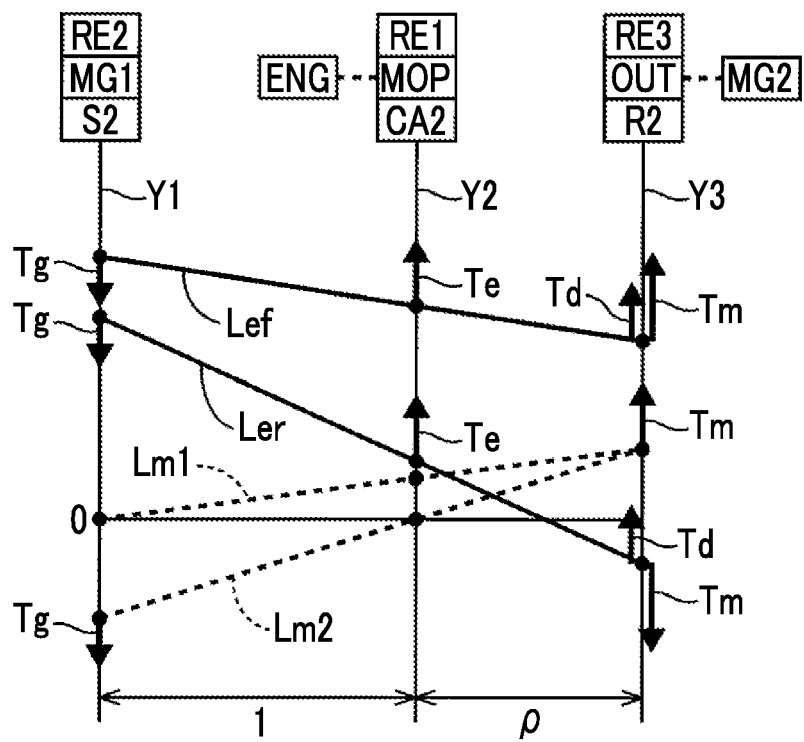
FIG. 3 is an alignment chart relatively showing a rotation speed of each of rotating elements in a differential unit.

FIG. 3 is an alignment chart relatively showing a rotation speed of each of rotating elements in the differential unit 60. In FIG. 3, three vertical lines Y1, Y2, and Y3 correspond to three rotating elements of the second planetary gear mechanism 82 constituting the differential unit 60. The vertical line Y1 represents the rotation speed of the second sun gear S2, which is the second rotating element RE2 to which the first rotating machine MG1 (see "MG1" in the figure) is connected. The vertical line Y2 represents the rotation speed of the second carrier CA2, which is the first rotating element RE1 to which the engine 12 (see "ENG" in the figure) is connected through the transmission unit 58. The vertical line Y3 represents the rotation speed of the second ring gear R2, which is the third rotating element RE3, which is integrally connected to the drive gear 74 (see "OUT" in the figure). The second rotating machine MG2 (see "MG2" in the figure) is connected to the driven gear 62 that meshes with the drive gear 74 through the reduction gear 70 and the like. A mechanical oil pump (see "MOP" in the figure) provided in the vehicle 10 is connected to the second carrier CA2. The mechanical oil pump is driven by the rotation of the second carrier CA2, and supplies oil used for the engagement operation of the clutch C1 and the brake B1, the lubrication of each part, and the cooling of each part. When the rotation of the second carrier CA2 is stopped, oil is supplied by an electric oil pump (not shown) provided in the vehicle 10. The intervals between the vertical lines Y1, Y2, and Y3 are determined according to the gear ratio ρ of the second planetary gear mechanism 82 (the number of teeth of the sun gear/the number of teeth of the ring gear). When the space between the sun gear and the carrier is set to an interval corresponding to "1" in the relationship between the vertical axes of the alignment chart, the space between the carrier and the ring gear is set to an interval corresponding to the gear ratio ρ.

A solid line Lef in FIG. 3 indicates an example of relative speeds of respective rotating elements in forward traveling in an HV traveling mode, where the HV traveling mode is a traveling mode in which hybrid traveling (=HV traveling) is possible such that traveling is performed using at least the engine 12 as a power source. Further, the solid line Ler in FIG. 3 indicates an example of the relative speeds of respective rotating elements in backward traveling in the HV traveling mode. In the HV traveling mode, in the second planetary gear mechanism 82, for example, when the MG1 torque Tg generated by the first rotating machine MG1, which is a reaction torque of a negative torque with respect to the engine torque Te of the positive torque input to the second carrier CA2 through the transmission unit 58, is input to the second sun gear S2, a positive torque Td which is directly transmitted to the engine appears in the second ring gear R2. For example, in a case where the clutch C1 is engaged and the brake B1 is released and the transmission unit 58 is in the direct coupled condition of the gear ratio "1.0", when the MG1 torque Tg $(=\rho/(1+\rho) \times Te)$, which is the reaction torque with respect to the engine torque Te input to the second carrier CA2, is input to the second sun gear S2, the torque Td $(=Te/(1+\rho)=-(1/\rho) \times Tg)$ which is directly transmitted to the engine appears in the second ring gear R2. Then, according to the request driving force, the total torque of the torque Td directly transmitted to the engine and the MG2 torque Tm transmitted to the driven gear 62 can be transmitted to the drive wheels 16 as the driving torque of the vehicle 10. The first rotating machine MG1 functions as a generator when negative torque is generated by positive rotation. The battery 54 is charged with the generated electric power Wg of the first rotating machine MG1, and the second rotating machine MG2 consumes the generated power. The second rotating machine MG2 outputs the MG2 torque Tm by using all or some of the generated electric power Wg or by using the power from the battery 54 in addition to the generated power Wg. The MG2 torque Tm at the time of forward traveling is a powering torque that is a positive torque of positive rotation, and the MG2 torque Tm at the time of backward traveling is a powering torque that is a negative torque of negative rotation.

The differential unit 60 can be operated as an electric continuously variable transmission. For example, in the HV traveling mode, the operating state of the first rotating machine MG1 is controlled based on the output rotation speed No, which is the rotation speed of the drive gear 74 constrained by the rotation of the drive wheels 16, and thus the rotation speed of second carrier CA2 is increased or decreased when the rotation speed of the first rotating machine MG1, that is, the rotation speed of second sun gear S2 is increased or decreased. Since the second carrier CA2 is connected to the engine 12 through the transmission unit 58, the engine speed Ne of the engine, which is the engine speed of the engine 12, is increased or decreased by increasing or decreasing the rotation speed of the second carrier CA2. Therefore, in hybrid traveling, it is possible to perform control for setting the engine operating point Peng to an efficient operating point. This type of hybrid is called a machine split type or a split type. The first rotating machine MG1 is a rotating machine capable of controlling the engine speed Ne of the engine, that is, a rotating machine capable of adjusting the engine speed Ne of the engine. The operating point is an operating point represented by the rotation speed and the torque, and the engine operating point Peng is an operating point of the engine 12 represented by the engine speed Ne of the engine and the engine torque Te.

A dashed line Lm1 in FIG. 3 indicates an example of relative speeds of respective rotating elements in forward traveling, in a single drive EV mode in which motor traveling using just the second rotating machine MG2 as a power source can be performed, among motor traveling (=EV traveling) modes. A dashed line Lm2 in FIG. 3 indicates an example of relative speeds of respective rotating elements in forward traveling, in a dual drive EV mode in which motor traveling using both the first rotating machine MG1 and the second rotating machine MG2 as the power source can be performed, among the EV traveling modes. The EV traveling mode is a traveling mode in which motor traveling can be performed by using at least one of the first rotating machine MG1 and the second rotating machine MG2 as a power source in a state when the operation of the engine 12 is stopped.

In the single drive EV mode, the clutch C1 and the brake B1 are both released, and the transmission unit 58 is in the neutral state, and thus the differential unit 60 is also in the neutral state. In this state, the MG2 torque Tm can be transmitted to the drive wheels 16 as driving torque of the vehicle 10. In the single drive EV mode, for example, in order to reduce drag loss or the like in the first rotating machine MG1, the first rotating machine MG1 is maintained at zero rotation. For example, even if control is performed to maintain the first rotating machine MG1 at zero rotation, since the differential unit 60 is in the neutral state, it does not affect the driving torque.

In the dual drive EV mode, the clutch C1 and the brake B1 are both engaged to stop the rotation of each of rotating elements of the first planetary gear mechanism 80, and thus the second carrier CA2 is stopped to zero rotation. In this state, the MG1 torque Tg and the MG2 torque Tm can be transmitted to the drive wheels 16 as driving torque of the vehicle 10.

Returning to FIG. 1, the vehicle 10 further includes the electronic control unit 100 as a controller including a control device of the vehicle 10 related to control of the engine 12, the first rotating machine MG1, the second rotating machine MG2, and the like. The electronic control unit 100 includes, for example, a so-called microcomputer having a CPU, a RAM, a ROM, an input/output interface, and the like. The CPU performs various controls of the vehicle 10 by using a temporary storage function of the RAM and performing signal processing according to a program stored in the ROM in advance. The electronic control unit 100 may include computers for engine control, rotating machine control, hydraulic control, and the like, as necessary.

The electronic control unit 100 receives various signals or the like (for example, the intake air amount Qair, the turbocharging pressure Pchg, the intake air temperature THair, the throttle valve opening degree θth, the engine speed Ne of the engine, a crank angle Acr indicating the rotation position of the crankshaft of the engine 12, the output rotation speed No corresponding to the vehicle speed V, the MG1 rotation speed Ng which is the rotation speed of first rotating machine MG1, the MG2 rotation speed Nm which is the rotation speed of second rotating machine MG2, the accelerator operation amount θacc which is the accelerator operation amount of the driver indicating the magnitude of accelerator operation of the driver, the battery temperature THbat of battery 54, the battery charge/discharge current Ibat, the battery voltage Vbat, and the like) based on detection values by various sensors, or the like, provided in the vehicle 10 (for example, an air flow meter 34, a turbocharging pressure sensor 40, an intake air temperature sensor 42, a throttle valve opening degree sensor 44, an engine speed sensor 88, an output rotation speed sensor 90, an MG1 rotation speed sensor 92, an MG2 rotation speed sensor 94, an accelerator operation amount sensor 96, an battery sensor 98, and the like). From the electronic control unit 100, various command signals (for example, an engine control command signal Se for controlling the engine 12, a rotating machine control command signal Smg for controlling the first rotating machine MG1 and the second rotating machine MG2, a hydraulic control command signal Sp for controlling each operating state of clutch C1 and brake B1, and the like) are output to respective devices (for example, the engine control device 50, the inverter 52, the hydraulic control circuit 84, and the like) provided in the vehicle 10.

The electronic control unit 100 calculates a state of charge value SOC [%] as a value indicating the state of charge of the battery 54 based on, for example, the battery charge/discharge current Ibat and the battery voltage Vbat. Further, the electronic control unit 100 calculates chargeable/dischargeable electric powers Win and Wout that define a usable range of the battery power Pbat, which is the power of the battery 54, based on, for example, the battery temperature THbat and the state of charge SOC of the battery 54. The chargeable/dischargeable electric powers Win and Wout are a chargeable power Win as an inputtable power that defines a limit on the input power of the battery 54 and a dischargeable power Wout as an outputable power that defines a limit on the output power of the battery 54, respectively. For example, the chargeable/dischargeable electric powers Win and Wout decreases as the battery temperature THbat decreases in a low temperature range where the battery temperature THbat is lower than the normal range, and decreases as the battery temperature THbat increases in a high temperature range where the battery temperature THbat is higher than the normal range. Also, the chargeable electric power Win decreases as the state of charge SOC increases, for example, in a region where the state of charge SOC is high. Also, the dischargeable electric power Wout decreases as the state of charge SOC decreases, for example, in a region where the state of charge SOC is low.

The electronic control unit 100 includes a hybrid control unit, that is, a hybrid controller 102 to implement various controls in the vehicle 10.

The hybrid controller 102 includes an engine control unit for controlling the operation of the engine 12, that is, functions as an engine control unit, a function as an engine control unit, a rotating machine control unit for controlling the operations of the first rotating machine MG1 and the second rotating machine MG2 through the inverter 52, that is, a function as a rotating machine controller, and a power transmission switching unit for switching the power transmission state in the transmission unit 58, that is, a function as the power transmission switching unit, and with the above-mentioned control functions, performs hybrid drive control and the like by the engine 12, the first rotating machine MG1 and the second rotating machine MG2.

The hybrid controller 102 applies the accelerator operation amount θacc and the vehicle speed V to, for example, a driving force map, which is a relationship stored in advance experimentally or by design, that is, a predetermined relationship to calculate the request driving torque Twdem, which is the driving torque Tw requested for the vehicle 10. In other words, the request driving torque Twdem is the request driving power Pwdem at the vehicle speed V at that time. Here, an output rotation speed No or the like may be used instead of the vehicle speed V. As the driving force map, for example, different maps are set for forward traveling and backward traveling.

In order to implement the request driving power Pwdem by at least one power source of the engine 12, the first rotating machine MG1, and the second rotating machine MG2 in consideration of the request charge/discharge power, and the like, which is the charge/discharge power requested for the battery 54, the hybrid controller 102 outputs the engine control command signal Se, which is the command signal for controlling the engine 12 and the rotating machine control command signal Smg, which is the command signal for controlling the first rotating machine MG1 and the second rotating machine MG2.

For example, when the vehicle travels in the HV traveling mode, the engine control command signal Se is a command value of the engine power Pe that outputs the target engine torque Tetgt in the target engine speed Netgt in consideration of an optimum engine operating point Pengf, where the request engine power Pedem obtained by adding the request charge/discharge power, charge/discharge efficiency in the battery 54, or the like, to the request driving power Pwdem is implemented. Further, the rotating machine control command signal Smg is a command value of the generated electric power Wg of the first rotating machine MG1 that outputs the MG1 torque Tg at the rotation speed Ng of the MG1 at the time of command output as a reaction torque for setting the engine speed Ne of the engine to the target engine speed Netgt, and a command value of power consumption Wm of the second rotating machine MG2 that outputs the MG2 torque Tm at the rotation speed Nm of the MG2 at the time of command output. The MG1 torque Tg in the HV traveling mode is calculated, for example, in feedback control in which the first rotating machine MG1 is operated such that the engine speed Ne of the engine becomes the target engine speed Netgt. The MG2 torque Tm in the HV traveling mode is calculated to obtain the request driving torque Twdem, for example, in combination with the driving torque Tw based on the torque Td directly transmitted to the engine. The optimum engine operating point Pengf is predetermined, for example, as the engine operating point Peng at which the total fuel efficiency of the vehicle 10 is in its best considering the charge/discharge efficiency of the battery 54 in addition to the fuel efficiency of the engine 12 alone, when the request engine power Pedem is implemented. The target engine speed Netgt is a target value of the engine speed Ne of the engine, that is, the target engine speed of the engine 12, the target engine torque Tetgt is a target value of the engine torque Te, and the engine power Pe is the power of the engine 12. As described above, the vehicle 10 is a vehicle that controls the MG1 torque Tg, which is the reaction torque of the first rotating machine MG1, such that the engine speed Ne of the engine is the target engine speed Netgt.

Figure 4:
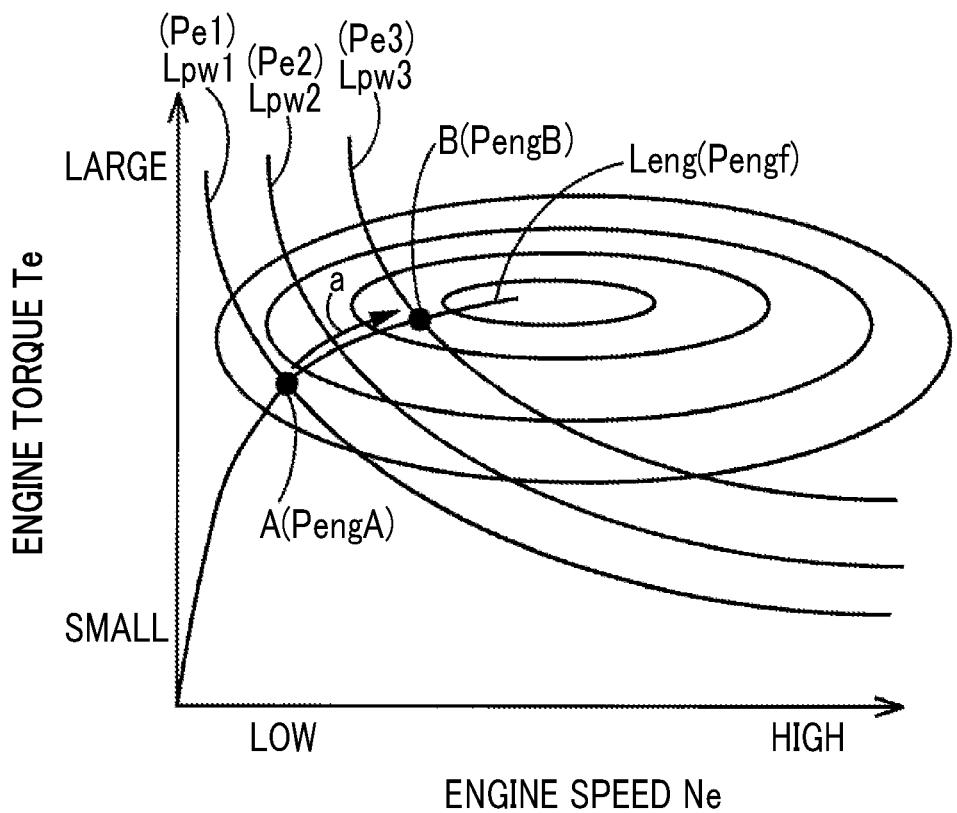
FIG. 4 is a diagram illustrating an example of an optimum engine operating point.

FIG. 4 is a diagram illustrating an example of optimum engine operating points Pengf on two-dimensional coordinates using the engine speed Ne of the engine and the engine torque Te as variables. In FIG. 4, a solid line Leng indicates a group of optimum engine operating points Pengf. The equal power lines Lpw1, Lpw2, and Lpw3 indicate an example when the request engine powers Pedem are the request engine power Pe1, Pe2, Pe3, respectively. Point A is an engine operating point PengA when the request engine power Pe1 is implemented on the optimum engine operating point Pengf, and point B is an engine operating point PengB when the request engine power Pe3 is implemented on the optimum engine operating point Pengf. The points A and B are also target values of the engine operating points Peng represented by the target engine speed Netgt and the target engine torque Tetgt, that is, the target engine operating points Pengtgt. When, for example, the target engine operating point Pengtgt is changed from the point A to the point B due to an increase in the accelerator operation amount θacc, control is performed such that the engine operating point Peng is changed on the path a passing over the optimum engine operating point Pengf.

The hybrid controller 102 selectively establishes the EV traveling mode or the HV traveling mode as the traveling mode according to the traveling state, and causes the vehicle 10 to travel in each traveling mode. For example, when the request driving power Pwdem is in a motor traveling region smaller than the predetermined threshold, the hybrid controller 102 establishes the EV traveling mode, and when the request driving power Pwdem is in a hybrid traveling region equal to or greater than the predetermined threshold, the hybrid controller 102 establishes the HV traveling mode. Even when the request driving power Pwdem is in the motor traveling region, the hybrid controller 102 establishes the HV traveling mode when the state of charge SOC of the battery 54 is less than a predetermined engine start threshold or when the engine 12 needs to be warmed up. The engine start threshold is a predetermined threshold for determining whether or not the state of charge SOC is a value at which the battery 54 needs to be charged through forcible start of the engine 12.

Figure 5:
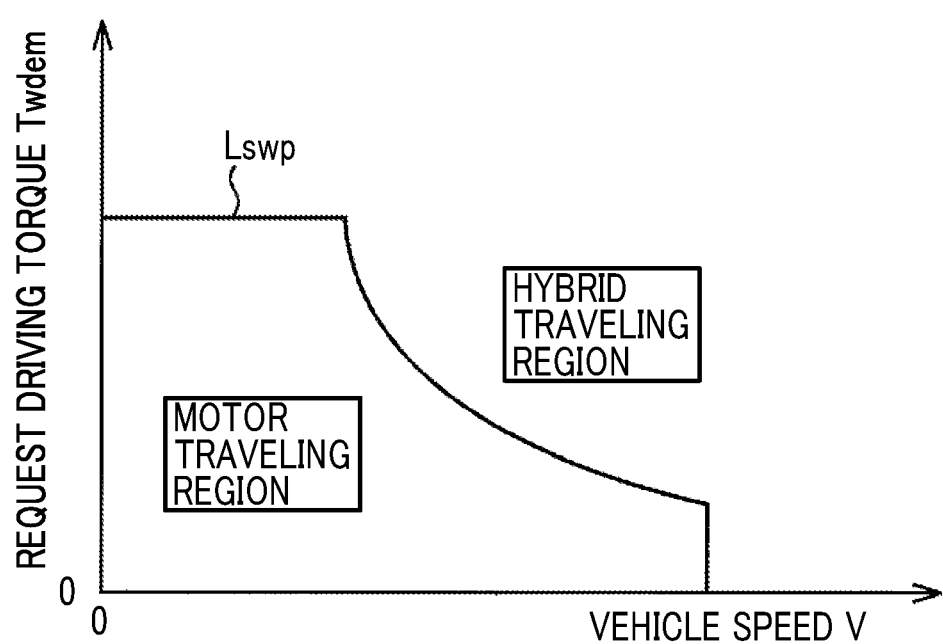
FIG. 5 is a diagram illustrating an example of a power source switching map used for switching control between motor traveling and hybrid traveling.

FIG. 5 is a diagram illustrating an example of a power source switching map used for switching control between motor traveling and hybrid traveling. In FIG. 5, a solid line Lswp is a boundary line between the motor traveling region and the hybrid traveling region for switching between the motor traveling and the hybrid traveling. A region where the request driving power Pwdem is relatively small, in which the vehicle speed V is relatively low and the request driving torque Twdem is relatively small, is predetermined in the motor traveling region. A region where the request driving power Pwdem is relatively large, in which the vehicle speed V is relatively high or the request driving torque Twdem is relatively large, is predetermined in the hybrid traveling region. When the state of charge SOC of the battery 54 is less than the engine start threshold or when the engine 12 needs to be warmed up, the motor traveling region in FIG. 5 may be changed to the hybrid traveling region.

When the EV traveling mode is established, the hybrid controller 102 establishes the single drive EV mode when the request driving power Pwdem can be implemented just by the second rotating machine MG2. On the other hand, when the EV traveling mode is established, the hybrid controller 102 establishes the dual drive EV mode when the request driving power Pwdem cannot be implemented just by the second rotating machine MG2. Even when the request driving power Pwdem can be implemented just by the second rotating machine MG2, the hybrid controller 102 may establish the dual drive EV mode when it is more efficient to use the first rotating machine MG1 and the second rotating machine MG2 together than to use merely the second rotating machine MG2.

When the HV traveling mode is established when the operation of the engine 12 is being brought to a stop, the hybrid controller 102 functions as an engine start controller for performing start control for starting the engine 12, that is, functions as an engine start controller. When the engine 12 is to be started, the hybrid controller 102 starts the engine 12, for example, by increasing the engine speed Ne of the engine by the first rotating machine MG1 and making ignition when the engine speed Ne of the engine becomes equal to or higher than a predetermined rotation speed at which ignition is possible. That is, the hybrid controller 102 starts the engine 12 by cranking the engine 12 with the first rotating machine MG1.

When the EV traveling mode is established during operation of the engine 12 or when a known stop-start control is performed that temporarily stops the engine 12 by stopping the vehicle during operation of the engine 12, for example, the hybrid controller 102 functions as an engine stop controlling unit that performs engine stop control that is control for stopping the engine 12, that is, an engine stop controller. When the engine 12 is being brought to a stop, the hybrid controller 102 stops the fuel supply to the engine 12, and controls the MG1 torque Tg to provide a torque that decreases the engine speed Ne of the engine to the engine 12. Here, the stop of the engine 12 is a stop of the operation of the engine 12 and a stop of rotation of the engine 12 without applying the engine brake torque by the engine 12 to the vehicle 10.

Specifically, the hybrid controller 102 starts engine stop control by stopping the fuel injection by the fuel injection device, stopping the application of the voltage to the ignition device, and further outputting the engine control command signal Se for fully closing the electronic throttle valve 38 to the engine control device 50. Next, the hybrid controller 102 calculates the target engine speed Netgt by using, for example, a target rotation speed map. The target rotation speed map has a predetermined relationship such that, for example, the engine speed Ne of the engine gradually decreases toward zero at a predetermined gradient with time. The predetermined gradient is a predetermined gradient for decreasing the engine speed Ne of the engine faster than a natural decrease to quickly pass through the rotation speed region where the resonance phenomenon of the power transmission system in the power transmission device 14 may easily occur, for example, when the operation of the engine 12 is stopped. The hybrid controller 102 calculates the initial value of a time counter TC corresponding to the engine speed Ne of the engine by applying, to the target engine speed map, the sensor value, that is, the engine speed Ne of the engine, which is the actual value, and calculates the target engine speed Netgt by applying, to the target rotation speed map, the value of the time counter TC, which is incremented each time a predetermined time elapses from the calculated initial value. Next, the hybrid controller 102 controls the MG1 torque Tg by feedback control such that the engine speed Ne is the target engine speed Netgt. The hybrid controller 102 calculates the MG1 torque command value Tgc, which is the command torque of the MG1 torque Tg at the time of controlling by feedback control, by applying the engine speed deviation ΔNe to the following equation (1), which is determined in advance. The engine speed deviation ΔNe is a deviation between the target engine speed Netgt and the engine speed Ne of the engine (=Netgt−Ne). In the following equation (1), the first term on the right side is a proportional term in the feedback term, and the second term on the right side is an integral term in the feedback term. "K1" and "K2" are feedback gains K (=FB gain K) in the feedback control, "K1" is the gain of the proportional term, and "K2" is the gain of the integral term. In the following equation (1), the third term on the right side is a feedforward term, "Tgt" is an MG1 torque correction value, and "K3" is a correction coefficient for correcting the MG1 torque correction value Tgt. Next, the hybrid controller 102 sets a cancel torque Tcan to the MG1 torque command value Tgc when the engine speed Ne of the engine is equal to or less than a predetermined threshold value Neu near zero, and then, sets the MG1 torque command value Tgc to zero to control engine stop control after a predetermined time elapses. The cancel torque Tcan is a torque for preventing a so-called undershoot in which the engine speed Ne of the engine has a negative value, and is a torque acting to increase the engine speed Ne of the engine. When the MG1 torque Tgc is input to the second sun gear S2 during performing the engine stop control, the torque Td ($=-(1/\rho)\times$ Tgc) directly transmitted to the engine appears in the second ring gear R2. Therefore, during performing the engine stop control, the hybrid controller 102 causes the second rotating machine MG2 to output the MG2 torque Tm for canceling the torque Td directly transmitted to the engine.

$$Tgc=K1\times(\Delta Ne)+K2\times\int(\Delta Ne)dt+K3\times Tgt \qquad (1)$$

The hybrid controller 102 functions as an engine stop position control unit for performing stop position control for controlling the crank angle Acr within a predetermined angle range Acrfrg when the engine 12 is stopped, that is, as an engine stop position controller. Specifically, when the engine 12 is stopped, it is desirable that the rotation of engine 12 is stopped such that, for example, a crank angle Acr is within a predetermined angle range Acrfrg from the angle Acr1 before the top dead center to an angle Acr2 after the top dead center in the compression stroke of any one of the cylinders of the engine 12, in order to suppress the vibration that may occur at the time of starting the next engine. The predetermined angle range Acrfrg is, for example, a range of a predetermined crank angle Acr in which a shock is reduced at the time of starting the engine. When the crank angle Acr is outside the predetermined angle range Acrfrg when the engine 12 is stopped, the hybrid controller 102 sets the MG1 torque command value Tgc based on the difference between the crank angle Acr and the stop target crank angle Acrtgt and drives the first rotating machine MG1 such that the crank angle Acr falls within the predetermined angle range Acrfrg. The target crank angle Acrtgt at stopping is a predetermined value within the predetermined angle range Acrfrg, and is, for example, a central value of the predetermined angle range Acrfrg.

The hybrid controller 102 controls each engagement operation of the clutch C1 and the brake B1 based on the established traveling mode. The hybrid controller 102 outputs, to the hydraulic control circuit 84, a hydraulic control command signal Sp for engaging and/or releasing each of the clutch C1 and the brake B1 such that power transmission for traveling in the established traveling mode is enabled.

Figures 6, 7:
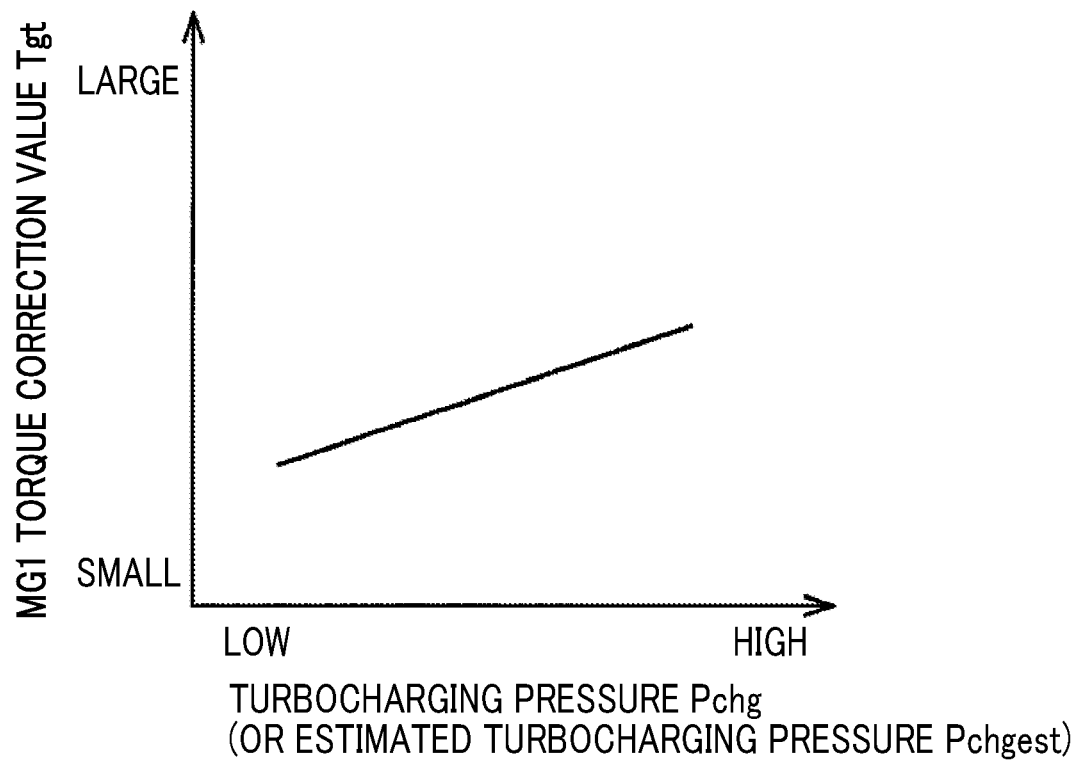
FIG. 6 is a table showing operation states of a clutch and a brake in each traveling mode.
FIG. 7 is a diagram illustrating an example of an MG1 torque correction value set based on a turbocharging pressure.

FIG. 6 is a table showing operation states of the clutch C1 and the brake B1 in each traveling mode. In FIG. 6, O mark indicates the engagement of each of the clutch C1 and the brake B1, blank indicates release, and Δ mark indicates that one of the two is engaged when the engine brake bringing the engine 12 in the rotation-stopped state into the rotation state is used together. "G" mark indicates that the first rotating machine MG1 mainly functions as a generator, and "M" mark indicates that each of the first rotating machine MG1 and the second rotating machine MG2 mainly functions as a motor when it is driven, and mainly functions as a generator during regeneration. The vehicle 10 can selectively implement the EV traveling mode and the HV traveling mode as the traveling mode. The EV traveling mode has two modes: a single drive EV mode and a dual drive EV mode.

The single drive EV mode is implemented in a state where both the clutch C1 and the brake B1 are released. In the single drive EV mode, since the clutch C1 and the brake B1 are released, the transmission unit 58 is in the neutral state. When transmission unit 58 is set to the neutral state, the differential unit 60 is set to the neutral state in which the reaction torque of MG1 torque Tg is not taken in the second carrier CA2 connected to first ring gear R1. In this state, the hybrid controller 102 causes the second rotating machine MG2 to output the MG2 torque Tm for traveling (see the dashed line Lm1 in FIG. 3). In the single drive EV mode, it is also possible to rotate the second rotating machine MG2 reversely with respect to forward traveling to travel backward.

In the single drive EV mode, the first ring gear R1 is rotated by the second carrier CA2, but since the transmission unit 58 is in the neutral state, the engine 12 is not rotated and is stopped at zero rotation. Therefore, when the regenerative control is performed by the second rotating machine MG2 during traveling in the single drive EV mode, a large regenerative amount can be obtained. When the battery 54 is fully charged and regenerative energy cannot be obtained during traveling in the single drive EV mode, it is conceivable to use an engine brake together. When the engine brake is used together, the brake B1 or the clutch C1 is engaged (see "WITH ENGINE BRAKE" in FIG. 6). When the brake B1 or the clutch C1 is engaged, the engine 12 is brought into the rotated state, and the engine brake is applied.

The dual drive EV mode is implemented in a state where the clutch C1 and the brake B1 are both engaged. In the dual drive EV mode, the rotation of each rotating element of the first planetary gear mechanism 80 is stopped by the engagement of the clutch C1 and the brake B1, the engine 12 is in a stopped state at zero rotation, and the rotation of the second carrier CA2 connected to the first ring gear R1 is also stopped. When the rotation of the second carrier CA2 is stopped, since the reaction torque of the MG1 torque Tg can be obtained in the second carrier CA2, the MG1 torque Tg can be mechanically output from the second ring gear R2 and transmitted to the drive wheels 16. In this state, the hybrid controller 102 causes the first rotating machine MG1 and the second rotating machine MG2 to output the MG1 torque Tg and the MG2 torque Tm for traveling (see the dashed line Lm2 in FIG. 3). In the dual drive EV mode, it is also possible to cause both the first rotating machine MG1 and the second rotating machine MG2 to rotate reversely with respect to forward traveling to travel backward.

The low state of the HV traveling mode is implemented in a state where the clutch C1 is engaged and a state where the brake B1 is released. In the low state of the HV traveling mode, since the clutch C1 is engaged, the rotating elements of the first planetary gear mechanism 80 are integrally rotated, and the transmission unit 58 is brought into a direct coupled condition. Therefore, the rotation of the engine 12 is transmitted at a constant speed from the first ring gear R1 to the second carrier CA2. The high state of the HV traveling mode is implemented when the brake B1 is engaged and the clutch C1 is released. In the high state of the HV traveling mode, the rotation of the first sun gear S1 is stopped by the engagement of the brake B1, and the transmission unit 58 is brought into an overdrive condition. Therefore, the rotation of the engine 12 is accelerated and transmitted from the first ring gear R1 to the second carrier CA2. In the HV traveling mode, the hybrid controller 102 outputs the MG1 torque Tg, which is a reaction torque to the engine torque Te, by the power generation of the first rotating machine MG1, and outputs the MG2 torque Tm from the second rotating machine MG2 by the generated electric power Wg of the first rotating machine MG1 (see the solid line Lef in FIG. 3). In the HV traveling mode, for example, in the low state of the HV traveling mode, it is also possible to rotate the second rotating machine MG2 reversely with respect to the forward traveling to travel backward (see the solid line Ler in FIG. 3). In the HV traveling mode, it is possible to further add the MG2 torque Tm using the electric power from the battery 54 for traveling. In the HV traveling mode, for example, when the vehicle speed V is relatively high and the request driving torque Twdem is relatively small, the high state of the HV traveling mode is established.

However, in the vehicle 10 equipped with the engine 12 having the turbocharger 18, the turbocharging pressure Pchg remains during the transition where the engine 12 in turbocharging is being brought to a stop. Since the losses of pumps of the engine 12 differ due to the remaining turbocharging pressure Pchg, the engine speed Ne of the engine cannot be properly reduced with the MG1 torque command value Tgc being calculated using the equation (1) without considering the turbocharging pressure Pchg. Therefore, there is a possibility that vibration generated in vehicle 10 due to passing through the rotation speed region where the resonance phenomenon is likely to occur cannot be appropriately suppressed. Therefore, the hybrid controller 102 calculates the MG1 torque command value Tgc considering the turbocharging pressure Pchg.

Specifically, the electronic control unit 100 further includes a state determination unit, that is, a state determination unit 104, in order to implement a control function for appropriately suppressing vibration generated in the vehicle 10 when the engine 12 is being brought to a stop.

The state determination unit 104 determines whether the hybrid controller 102 has determined that the engine stop control is to be performed. For example, when the vehicle is shifted from the HV traveling mode to the EV traveling mode, or when a predetermined condition for performing the stop-start control when the vehicle 10 is stopped is satisfied, the hybrid controller 102 determines that the engine stop control is to be performed.

When determination is made that the hybrid controller 102 has determined that the engine stop control is to be performed, the state determination unit 104 determines whether or not the engine 12 is stopped from the turbocharged state in which the turbocharging operation of the turbocharger 18 is effective, that is, whether or not the engine 12 has been stopped during turbocharging. The state determination unit 104 determines that the turbocharging is being performed when the turbocharging pressure Pchg is equal to or higher than the predetermined turbocharging pressure Pchgf. The predetermined turbocharging pressure Pchgf is, for example, a predetermined lower limit value of the turbocharging pressure Pchg at which determination can be made that the turbocharging operation by the turbocharger 18 can be effective.

When the state determination unit 104 determines that the engine 12 is not stopped during turbocharging, that is, when the state determination unit 104 determines that the engine 12 in which turbocharging is not being performed is stopped, the hybrid controller 102 sets the FB gain K at the time of non-turbocharging is set as the FB gain K in the equation (1), and sets a value of zero as the MG1 torque correction value Tgt in the equation (1).

When the state determination unit 104 determines that the engine 12 is stopped during turbocharging, the hybrid controller 102 sets the MG1 torque correction value Tgt according to the turbocharging pressure Pchg as the MG1 torque correction value Tgt in the equation (1).

FIG. 7 is a diagram illustrating an example of the MG1 torque correction value Tgt set based on the turbocharging pressure Pchg. In FIG. 7, the MG1 torque correction value Tgt is set to a larger value in advance as the turbocharging pressure Pchg is higher. In a region where the turbocharging pressure Pchg, which is the residual pressure when the operation of the engine 12 is stopped, is large, a large MG1 torque correction value Tgt is determined in advance such that the torque for lowering the engine speed Ne of the engine is increased.

In the equation (1), the first and second terms on the right side are feedback control amount by the feedback control for controlling the MG1 torque Tg such that the engine speed Ne of the engine becomes the target engine speed Netgt gradually reducing toward zero. In the equation (1), the third term on the right side including the MG1 torque correction value Tgt is the feedforward control amount of the MG1 torque Tg that is made larger when the turbocharging pressure Pchg is higher than when the turbocharging pressure Pchg is lower. At the time of decreasing the engine speed Ne of the engine when the engine 12 is being brought to a stop, the hybrid controller 102 controls the MG1 torque Tg based on the feedback control amount and the feedforward control amount. In this way, the hybrid controller 102 makes the MG1 torque Tg at the time of decreasing the engine speed Ne of the engine larger when the turbocharging pressure Pchg by the turbocharger 18 is higher than when the turbocharging pressure Pchg is lower. Referring to FIG. 7, the hybrid controller 102 makes the MG1 torque Tg at the time of decreasing the engine speed Ne of the engine larger as the turbocharging pressure Pchg is higher.

When the gains K1 and K2 and the correction coefficient K3 in the equation (1) remain at the predetermined initial values, it is likely that the stop transition time TMstop, which is the time from the starting time point of the engine stop control to the stop of the engine 12, that is, the end of the engine stop control, deviates from the ideal time. The ideal time is a target stop transition time TMstoptgt as a target value of the stop transition time TMstop determined in advanced. The hybrid controller 102 corrects the gains K1 and K2 and the correction coefficient K3 in the equation (1) by learning control based on a stop transition time deviation ΔTMstop (=TMstoptgt−TMstop1) which is a deviation between the current stop transition time TMstop1, which is the value of the stop transition time TMstop at a current control and the target stop transition time TMstoptgt. The current control is the latest engine stop control, that is, the engine stop control that has been most recently performed.

Figure 8:
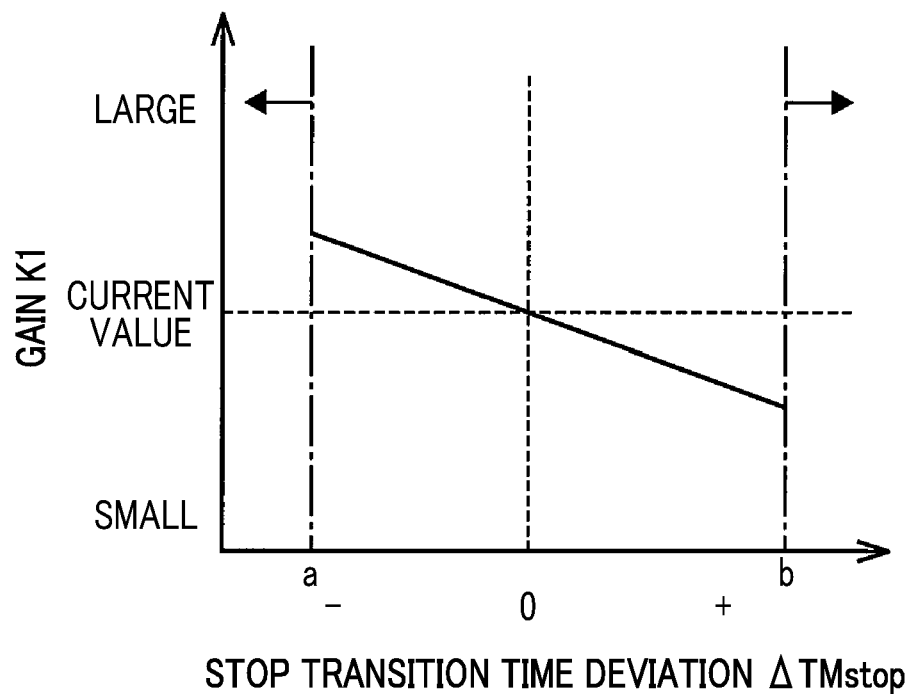
FIG. 8 is a diagram illustrating an example of a gain of a proportional term of FB gains set based on a stop transition time deviation.

FIG. 8 is a diagram illustrating an example of the gain K1 set based on the stop transition time deviation ΔTMstop. In FIG. 8, when the stop transition time deviation ΔTMstop is zero, since the engine 12 is stopped at the target stop transition time TMstoptgt, the gain K1 remains at the current value. When the stop transition time deviation ΔTMstop is a positive value (+), since the engine 12 is stopped for a short period of time relative to the target stop transition time TMstoptgt, the gain K1 is set to a value smaller than the current value such that the MG1 torque command value Tgc at the next control is reduced and a next stop transition time TMstopn, which is a value of the stop transition time TMstop at the next control, is increased. When the stop transition time deviation ΔTMstop is a negative value (−), since the engine 12 is stopped for a long period of time relative to the target stop transition time TMstoptgt, the gain K1 is set to a value larger than the current value such that the MG1 torque command value Tgc at the next control is increased and the next stop transition time TMstopn is reduced. When the stop transition time deviation ΔTMstop is smaller than the value a or larger than the value b, the gain K1 is not corrected as abnormal. The current value of the gain K1 is a predetermined initial value of the gain K1 when the current control is the first engine stop control. The initial value of the gain K1 in turbocharging may be set to the same value as the gain K1 in non-turbocharging, or may be set to a different value. The next control is the engine stop control that is to be performed next.

Figure 9:
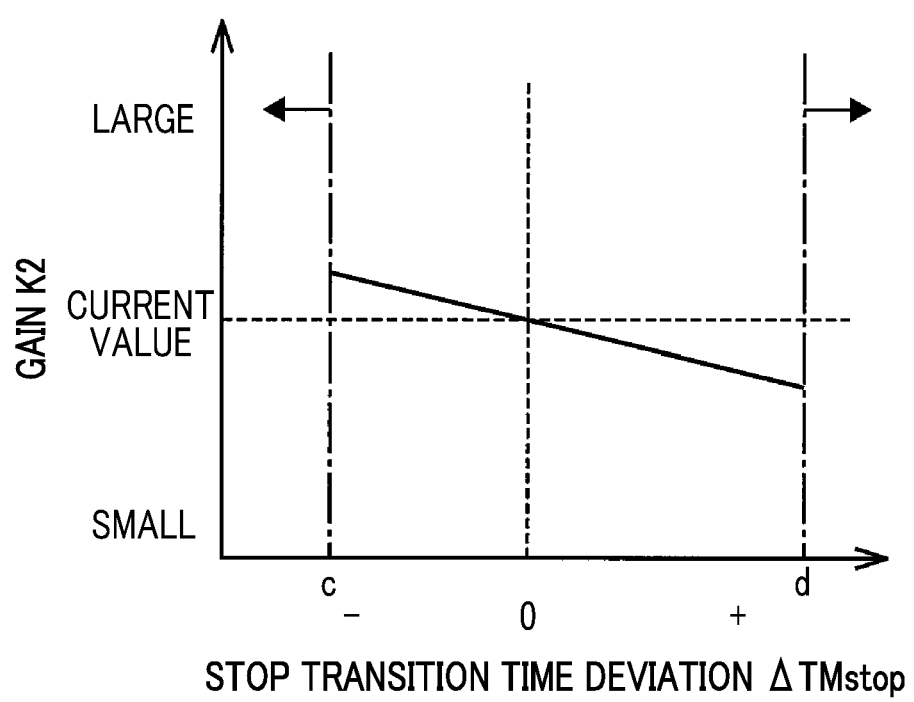
FIG. 9 is a diagram illustrating an example of a gain of an integral term of the FB gains set based on the stop transition time deviation.

FIG. 9 is a diagram illustrating an example of the gain K2 set based on the stop transition time deviation ΔTMstop. In FIG. 9, from the same viewpoint as the correction of the gain K1 described with reference to FIG. 8, when the stop transition time deviation ΔTMstop is zero, the gain K2 remains at the current value, when the stop transition time deviation ΔTMstop is a positive value (+), the gain K2 is set to a value smaller than the current value, and when the stop transition time deviation ΔTMstop is a negative value (−), the gain K2 is set to a value larger than the current value. When the stop transition time deviation ΔTMstop is smaller than the value c or larger than the value d, the gain K2 is not corrected as abnormal. The current value of the gain K2 is a predetermined initial value of the gain K2 when the current control is the first engine stop control. The initial value of the gain K2 in turbocharging may be set to the same value as the gain K2 in non-turbocharging, or may be set to a different value.

Figure 10:
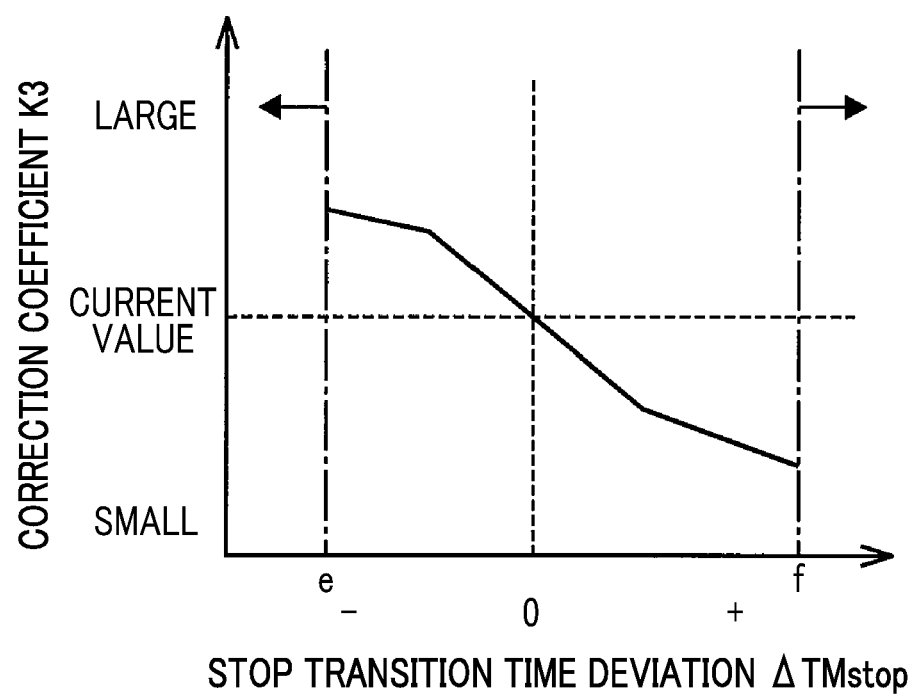
FIG. 10 is a diagram illustrating an example of a correction coefficient for correcting a feedforward control amount set based on the stop transition time deviation.

FIG. 10 is a diagram showing an example of the correction coefficient K3 set based on the stop transition time deviation ΔTMstop. In FIG. 10, from the same viewpoint as the correction of the gain K1 described with reference to FIG. 8, when the stop transition time deviation ΔTMstop is zero, the correction coefficient K3 remains at the current value, when the stop transition time deviation ΔTMstop is a positive value (+), the correction coefficient K3 is set to a value smaller than the current value, and when the stop transition time deviation ΔTMstop is a negative value (−), the correction coefficient K3 is set to a value larger than the current value. When the stop transition time deviation ΔTMstop is smaller than the value e or larger than the value f, the correction coefficient K3 is not corrected as abnormal. The current value of the correction coefficient K3 is a predetermined initial value of the correction coefficient K3 when the current control is the first engine stop control.

As described above, the hybrid controller 102 corrects the gains K1 and K2 in the equation (1), which is the FB gains K in the feedback control, by learning control based on the stop transition time deviation ΔTMstop such that the next stop transition time TMstopn approaches the target stop transition time TMstoptgt. Further, the hybrid controller 102 corrects the third term on the right side of the equation (1), including the correction coefficient K3 which is a feedforward control amount, by learning control based on the stop transition time deviation ΔTMstop such that the next stop transition time TMstopn approaches the target stop transition time TMstoptgt.

After the operation of the engine 12 is stopped, the turbocharging pressure Pchg gradually decreases. Depending on the sensitivity and accuracy of the turbocharging pressure sensor 40, it is likely that the turbocharging pressure Pchg cannot be detected accurately in a region where the turbocharging pressure Pchg is small. Then, the controllability of the MG1 torque Tg during the transition of the engine stop control may be reduced. The hybrid controller 102 may estimate the turbocharging pressure Pchg when the engine 12 is stopped based on the detection value of the turbocharging pressure sensor 40 obtained at the starting time point of the engine stop control and the elapsed time from the starting time point of the engine stop control. More specifically, the hybrid controller 102 calculates an estimated turbocharging pressure Pchgest, which is an estimated value of the turbocharging pressure Pchg, by applying the detection value of the turbocharging pressure sensor 40 obtained at the start of the engine stop control and the time elapsed from the start of the engine stop control, to predetermined decrease characteristic of the turbocharging pressure Pchg when the operation of the engine 12 is stopped. Then, the hybrid controller 102 may set the MG1 torque correction value Tgt according to the estimated turbocharging pressure Pchgest (see FIG. 7).

Figure 11:
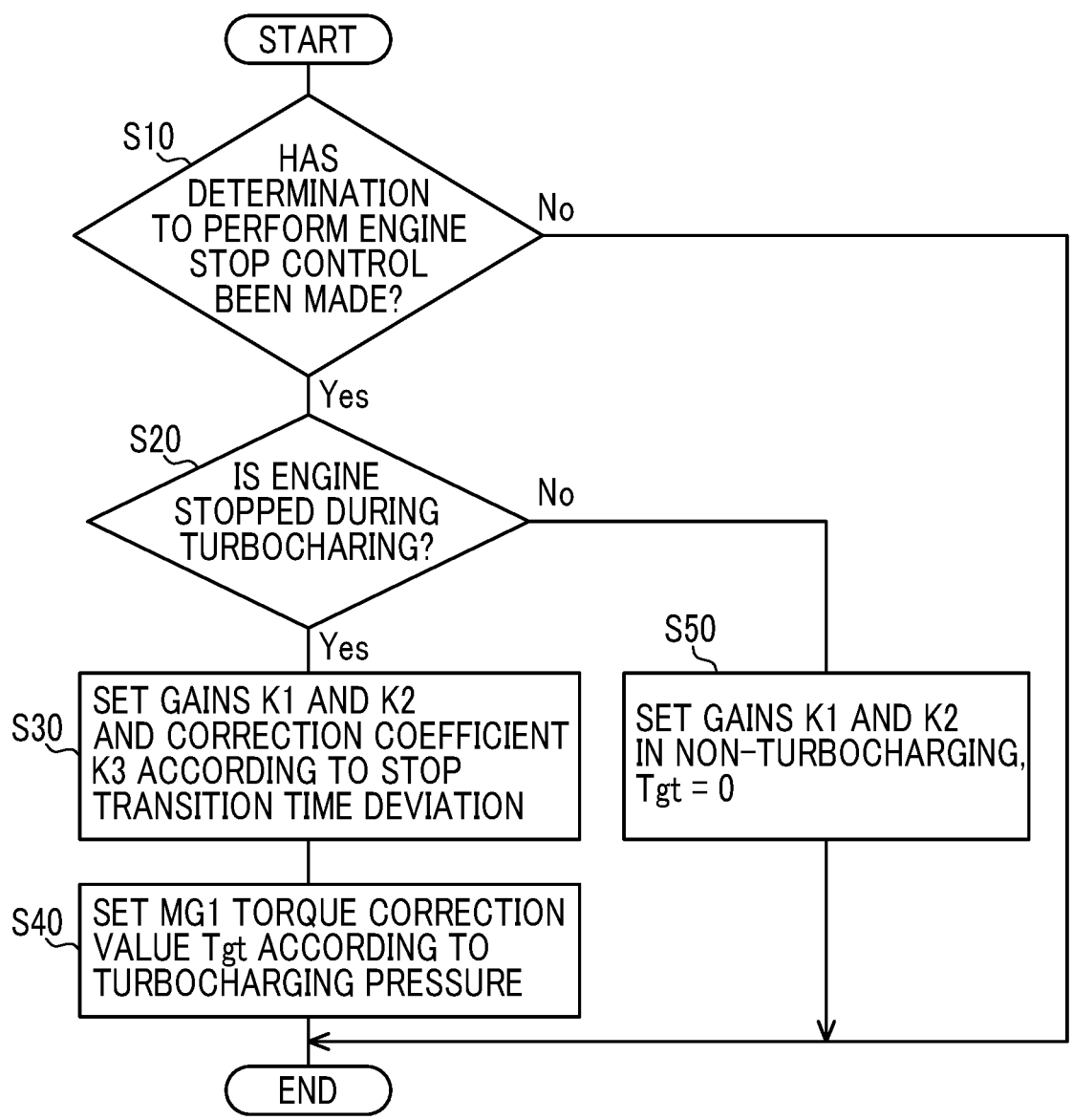
FIG. 11 is a flowchart illustrating a main part of a control operation of the electronic control unit, that is, a control operation for appropriately suppressing vibration generated in the vehicle when the engine is being brought to a stop.

FIG. 11 is a flowchart illustrating a main part of a control operation of the electronic control unit 100, that is, a control operation for appropriately suppressing vibration generated in the vehicle 10 when the engine 12 is being brought to a stop, and is repeatedly executed, for example.

In FIG. 11, first, in step (hereinafter, step is omitted) S10 corresponding to the function of the state determination unit 104, determination is made whether or not a determination to perform the engine stop control has been made. If the determination in S10 is negative, this routine ends. When the determination in S10 is affirmative, in S20 corresponding to the function of the state determination unit 104, determination is made whether or not the engine 12 is stopped during turbocharging. When the determination in S20 is affirmative, in S30 corresponding to the function of the hybrid controller 102, the gains K1 and K2 and the correction coefficient K3 in the equation (1) according to the stop transition time deviation ΔTMstop are set. During the first engine stop control, initial values are set for each of the gains K1 and K2 and the correction coefficient K3. Next, in S40 corresponding to the function of the hybrid controller 102, the MG1 torque correction value Tgt according to the turbocharging pressure Pchg is set as the MG1 torque correction value Tgt in the equation (1). On the other hand, when the determination in S20 is negative, in S50 corresponding to the function of the hybrid controller 102, the gains K1 and K2 in non-turbocharging, for example, predetermined initial values of the gains K1 and K2 are set as the gains K1 and K2 in the equation (1), respectively, and a value of zero is set as the MG1 torque correction value Tgt in the equation (1).

As described above, according to the embodiment, the MG1 torque Tg at the time of decreasing the engine speed Ne of the engine is made larger when the turbocharging pressure Pchg by the turbocharger 18 is higher than when the turbocharging pressure is lower. In this way, even if the losses of pumps of the engine 12 differ due to the remaining turbocharging pressure Pchg during the transition of stopping the engine 12 in turbocharging, it is possible to appropriately reduce the engine speed Ne of the engine. Therefore, when the engine 12 is being brought to a stop, it is possible to appropriately suppress vibration generated in the vehicle 10.

Further, according to the embodiment, since the MG1 torque Tg at the time of decreasing the engine speed Ne of the engine is made larger as the turbocharging pressure Pchg increases, it is possible to reduce the engine speed Ne of the engine more appropriately during the transition to stop the engine 12 in turbocharging.

Further, according to the embodiment, when the engine speed Ne of the engine is reduced, since the MG1 torque Tg is controlled based on the feedback control amount by the feedback control for controlling the MG1 torque Tg such that the engine speed Ne of the engine is the target engine speed Netgt gradually reduced to zero and the feedforward control amount of the Mg1 torque Tg that is made larger when the turbocharging pressure Pchg is higher than when the turbocharging pressure Pchg is lower, the MG1 torque Tg at the time of decreasing the engine speed Ne of the engine is appropriately controlled.

According to the embodiment, since the FB gain K in the feedback control is corrected by learning control based on the stop transition time deviation ΔTMstop such that the next stop transition time Tmstopn approaches the target stop transition time TMstoptgt, it is possible to appropriately reduce the engine speed Ne of the engine such that the stop transition time TMstop is the target stop transition time TMstoptgt.

According to the embodiment, since the feedforward control amount is corrected by learning control based on the stop transition time deviation ΔTMstop such that the next stop transition time Tmstopn approaches the target stop transition time TMstoptgt, it is possible to appropriately reduce the engine speed Ne of the engine such that the stop transition time TMstop is the target stop transition time TMstoptgt.

Further, according to the embodiment, the turbocharging pressure Pchg when the engine 12 is being brought to a stop is estimated based on the detection value obtained by the turbocharging pressure sensor 40 at the starting time point of the engine stop control and an elapsed time from the starting time point of the engine stop control. In this way, for example, even when the value detected by the turbocharging pressure sensor 40 cannot be used in a low range of the turbocharging pressure Pchg due to the decrease in sensor accuracy, it is possible to control the MG1 torque Tg at the time of decreasing the engine speed Ne of the engine according to the turbocharging pressure Pchg.

Next, other embodiments of the disclosure will be described. In the following description, portions common to the embodiments are denoted by the same reference numerals, and description thereof is omitted.

Figure 12:
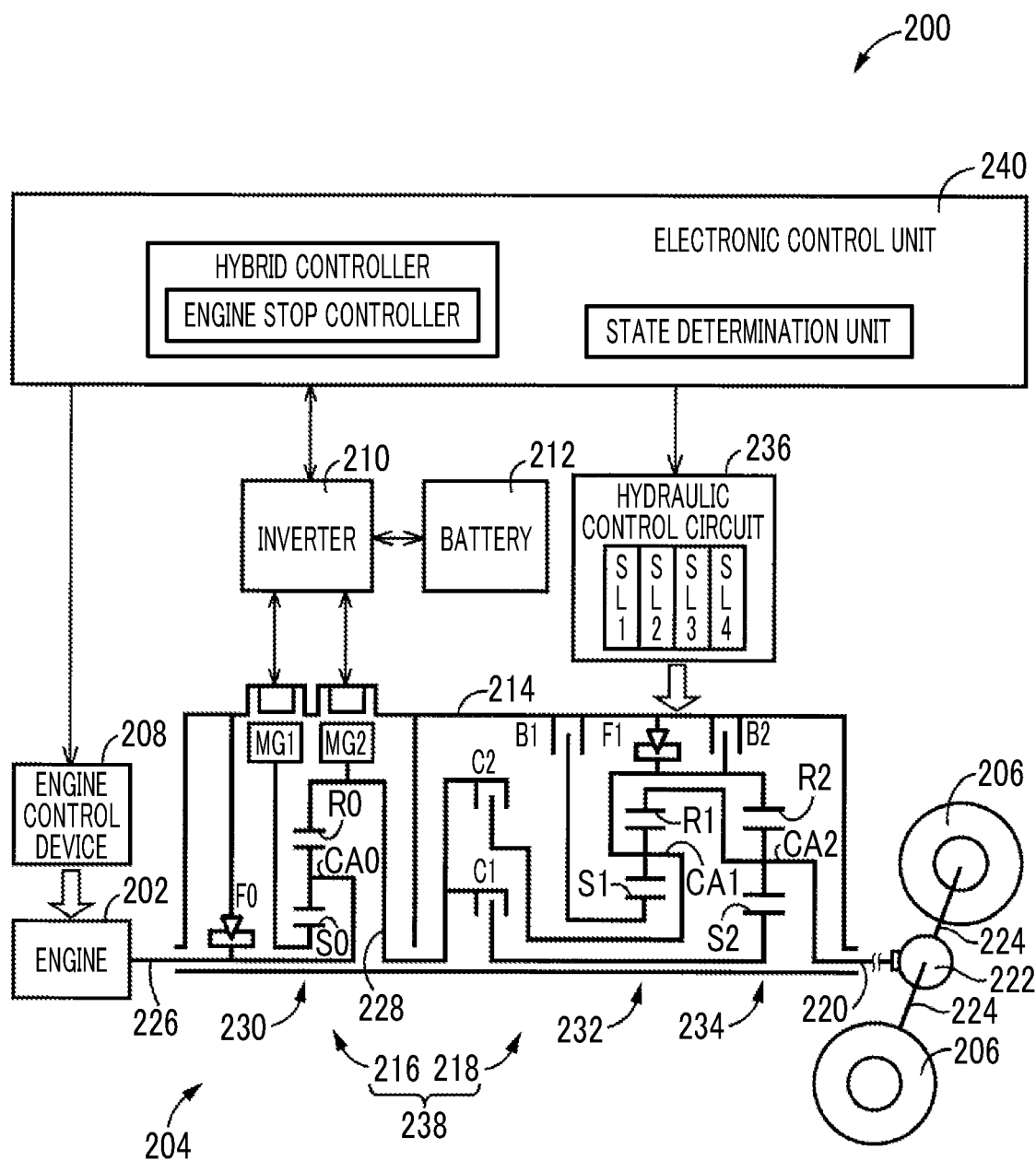
FIG. 12 is a diagram illustrating a schematic configuration of a vehicle to which the present disclosure is applied and which is different from the vehicle of FIG. 1.

In the embodiment, a vehicle 200 as illustrated in FIG. 12, which is different from the vehicle 10 described in the first embodiment, is illustrated. FIG. 12 is a diagram illustrating a schematic configuration of a vehicle 200 to which the disclosure is applied. In FIG. 12, the vehicle 200 is a hybrid vehicle including an engine 202, a first rotating machine MG1, a second rotating machine MG2, a power transmission device 204, and drive wheels 206.

The engine 202, the first rotating machine MG1, and the second rotating machine MG2 make the same configuration as the engine 12, the first rotating machine MG1, and the second rotating machine MG2 described in the first embodiment. In the engine 202, the engine torque Te is controlled by controlling an engine control device 208, such as an electronic throttle valve, a fuel injection device, an ignition device, and a wastegate valve provided in the vehicle 200, by an electronic control unit 240 to be described later. Each of the first rotating machine MG1 and the second rotating machine MG2 is connected to a battery 212 provided in the vehicle 200 through an inverter 210 provided in the vehicle 200. In the first rotating machine MG1 and the second rotating machine MG2, the MG1 torque Tg and the MG2 torque Tm are controlled by controlling the inverter 210 by the electronic control unit 240, respectively.

The power transmission device 204 includes an electric continuously variable transmission unit 216, a mechanical stepped transmission unit 218, and the like, which are arranged in series on a common axis in a case 214 as a non-rotating member mounted to the vehicle body. The electric continuously variable transmission unit 216 is directly or indirectly connected to the engine 202 through a damper (not shown) or the like. The mechanical stepped transmission unit 218 is connected to the output side of the electric continuously variable transmission unit 216. The power transmission device 204 includes a differential gear device 222 connected to an output shaft 220 which is an output rotating member of the mechanical stepped transmission unit 218, a pair of axles 224 connected to the differential gear device 222, and the like. In the power transmission device 204, power output from the engine 202 and the second rotating machine MG2 is transmitted to the mechanical stepped transmission unit 218, and is transmitted from the mechanical stepped transmission unit 218 to the drive wheels 206 through the differential gear device 222 and the like. The power transmission device 204 configured as described above is suitably used for a vehicle of a front engine rear drive (FR) system. Hereinafter, the electric continuously variable transmission unit 216 is referred to as a continuously variable transmission unit 216, and the mechanical stepped transmission unit 218 is referred to as a stepped transmission unit 218. Further, the continuously variable transmission unit 216, the stepped transmission unit 218, and the like are configured substantially symmetrically with respect to the common axis, and the lower half of the axis is omitted in FIG. 12. The common axis is the axis of the crankshaft of the engine 202 and the connection shaft 226 connected to the crankshaft.

The continuously variable transmission unit 216 includes a differential mechanism 230 as a power split device mechanically splitting the power of the engine 202 into the first rotating machine MG1 and the intermediate transmission member 228 that is the output rotating member of the continuously variable transmission unit 216. The first rotating machine MG1 is a rotating machine to which the power of the engine 202 is transmitted. The second rotating machine MG2 is connected to the intermediate transmission member 228 to transmit power. Since the intermediate transmission member 228 is connected to the drive wheels 206 through the stepped transmission unit 218, the second rotating machine MG2 is a rotating machine connected to the drive wheels 206 to transmit power. The differential mechanism 230 is a differential mechanism that splits the power of the engine 202 to transmit the split power to the drive wheels 206 and the first rotating machine MG1. The continuously variable transmission unit 216 is an electric continuously variable transmission in which the differential state of the differential mechanism 230 is controlled by controlling the operation state of the first rotating machine MG1. The first rotating machine MG1 is a rotating machine capable of controlling the engine speed Ne of the engine, that is, a rotating machine capable of adjusting the engine speed Ne of the engine.

The differential mechanism 230 may be a single pinion type planetary gear device, and includes a sun gear S0, a carrier CA0, and a ring gear R0. The engine 202 is connected to the carrier CA0 through the connection shaft 226 to transmit power, the sun gear S0 is connected to the first rotating machine MG1 to transmit power, and the ring gear R0 is connected to the second rotating machine MG2 to transmit power. In the differential mechanism 230, the carrier CA0 functions as an input element, the sun gear S0 functions as a reaction element, and the ring gear R0 functions as an output element.

The stepped transmission unit 218 is a mechanical transmission mechanism as a stepped transmission that forms a part of a power transmission path between the intermediate transmission member 228 and the drive wheels 206, that is, an automatic transmission that forms a part of a power transmission path between the differential mechanism 230 and the drive wheels 206. The intermediate transmission member 228 also functions as an input rotating member of the stepped transmission unit 218. The stepped transmission unit 218 is a known planetary gear type automatic transmission including, for example, a plurality of sets of planetary gear devices of a first planetary gear device 232 and a second planetary gear device 234, and a plurality of engagement devices of the clutch C1, the clutch C2, the brake B1, and the brake B2, together with the one-way clutch F1. Hereinafter, the clutch C1, the clutch C2, the brake B1, and the brake B2 are simply referred to as an engagement device CB unless otherwise specified.

The engagement device CB is a hydraulic friction engagement device including a multi-plate or single-plate clutch or brake pressed by a hydraulic actuator, a band brake tightened by a hydraulic actuator, and the like. The engagement device CB switches the operating state, such as engagement or release, by changing the engagement torque Tcb, which is torque capacity, with the regulated engagement hydraulic pressure PRcb of the engagement device CB output from each of solenoid valves SL1 to SL4 and the like in a hydraulic control circuit 236 provided in the vehicle 200.

The stepped transmission unit 218 is configured such that the rotating elements of the first planetary gear device 232 and the second planetary gear device 234 are partially connected to each other directly or indirectly though the engagement device CB or the one-way clutch F1, or connected to the intermediate transmission member 228, the case 214, or the output shaft 220. The rotating elements of the first planetary gear device 232 is a sun gear S1, a carrier CA1 and a ring gear R1, and rotating elements of the second planetary gear device 234 is a sun gear S2, a carrier CA2, and a ring gear R2.

When any one of the engagement devices is engaged, in the stepped transmission unit 218, any one is formed among plurality of gear stages having different gear ratios γat (=AT input rotation speed Ni/AT output rotation speed No). In the embodiment, the gear stage formed by the stepped transmission unit 218 is referred to as an AT gear stage. The AT input rotation speed Ni is the input rotation speed of the stepped transmission unit 218, has the same value as the rotation speed of the intermediate transmission member 228, and has the same value as the MG2 rotation speed Nm. The AT output rotation speed No is the rotation speed of the output shaft 220 that is the output rotation speed of the stepped transmission unit 218, and is also the output rotation speed of the composite transmission 238, which is the entire transmission including the continuously variable transmission unit 216 and the stepped transmission unit 218.

As shown in the engagement operation table of FIG. 13, for example, the stepped transmission unit 218 includes, as a plurality of AT gear stages, an AT first gear stage ("1st" in the figure) to an AT fourth gear stage ("4th in the figure"), that is, four forward AT gear stages. The gear ratio γat of the AT first gear stage is the largest, and the gear ratio γat is smaller as the AT gear stage is higher. The reverse AT gear stage ("Rev" in the figure) is formed, for example, by engagement of the clutch C1 and engagement of the brake B2. That is, when the vehicle travels in the reverse direction, for example, an AT1 gear stage is established. The engagement operation table in FIG. 13 summarizes the relationship between AT gear stages and operation states of the engagement devices. In FIG. 13, "O" mark indicates engagement, "Δ" mark indicates engagement during engine braking or coast-down shift of the stepped transmission unit 218, and blank indicates release.

In the stepped transmission unit 218, an AT gear stage formed according to an accelerator operation by a driver (a person who drives a vehicle), a vehicle speed V, and the like is switched by an electronic control unit 240 to be described later, that is, a plurality of AT gear stages is selectively provided. For example, in the shift control of the stepped transmission unit 218, shift is performed by any re-meshing of the engagement device CB, that is, a so-called clutch-to-clutch shift is performed where shift is performed by switching between engagement and release of the engagement device CB.

The vehicle 200 further includes a one-way clutch F0. The one-way clutch F0 is a lock mechanism that can fix the carrier CA0 such that the carrier CA0 cannot rotate. That is, the one-way clutch F0 is a lock mechanism that can fix, to the case 214, the connection shaft 226 connected to the crankshaft of the engine 202 and rotating integrally with the carrier CA0. In the one-way clutch F0, one of two relatively rotatable members is integrally connected to the connection shaft 226, and the other is integrally connected to the case 214. The one-way clutch F0 runs idle in a positive rotation direction, which is a rotation direction during operation of the engine 202, and automatically engages in a rotation direction opposite to the rotation direction during operation of the engine 202. Accordingly, when the one-way clutch F0 runs idle, the engine 202 is in a state capable of rotating relative to the case 214. On the other hand, when the one-way clutch F0 is engaged, the engine 202 is not in the state capable of rotating relative to the case 214. That is, the engine 202 is fixed to the case 214 by the engagement of the one-way clutch F0. Thus, one-way clutch F0 allows rotation of carrier CA0 in the positive rotation direction, which is the rotation direction during operation of the engine 202, and suppresses rotation of carrier CA0 in the negative rotation direction. That is, the one-way clutch F0 is a lock mechanism that allows rotation of the engine 202 in the positive rotation direction and suppresses rotation of the engine 202 in the negative rotation direction.

The vehicle 200 further includes an electronic control unit 240 as a controller including a control device of the vehicle 200 related to control of the engine 202, the first rotating machine MG1, the second rotating machine MG2, and the like. The electronic control unit 240 has the same configuration as the electronic control unit 100 shown in the above first embodiment. Various signals and the like, which are similar to those supplied to the electronic control unit 100, are supplied to the electronic control unit 240. From the electronic control unit 240, various command signals, which are similar to those output by the electronic control unit 100, are output. The electronic control unit 240 has functions equivalent to the respective functions of the hybrid controller 102 and the state determination unit 104 included in the electronic control unit 100. The electronic control unit 240 can implement a control function for appropriately suppressing vibration generated in the vehicle 10 when the engine 12 is being brought to a stop, which is similar to the implementation by the electronic control unit 100 as described in the above first embodiment.

According to the embodiment, the same effects as in the above first embodiment can be obtained.

Figure 14:
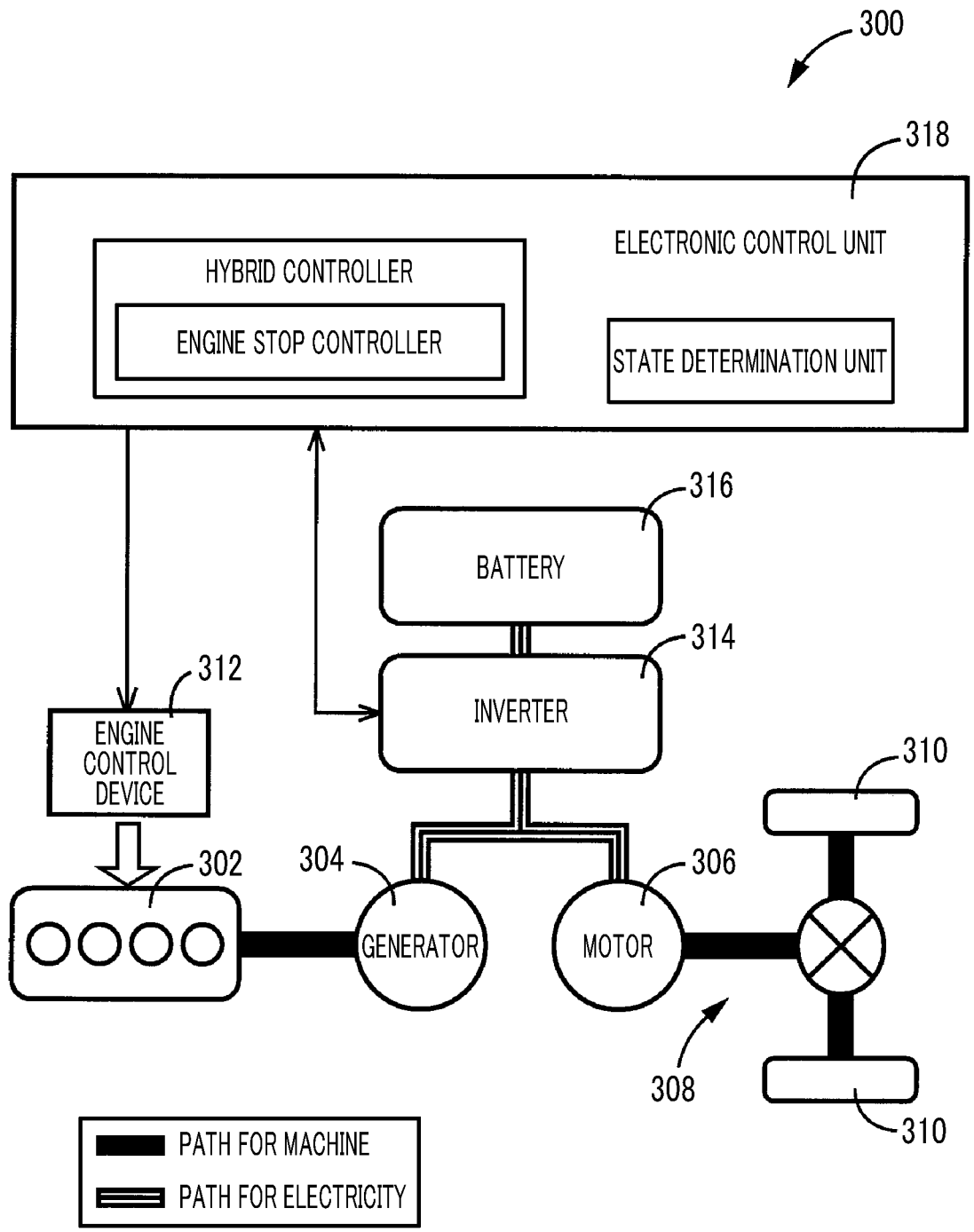
FIG. 14 is a diagram illustrating a schematic configuration of a vehicle to which the present disclosure is applied and which is different from the vehicles of FIG. 1 and FIG. 12.

The embodiment exemplifies a vehicle 300 as shown in FIG. 14, which is different from the vehicle 10 shown in the above first embodiment. FIG. 14 is a diagram illustrating a schematic configuration of a vehicle 300 to which the disclosure is applied. In FIG. 14, the vehicle 300 is a series-type hybrid vehicle including an engine 302, a generator 304, a motor 306, a power transmission device 308, and drive wheels 310.

The engine 302 has the same configuration as the engine 12 shown in the above first embodiment. In the engine 302, the engine torque Te is controlled by controlling an engine control device 312, such as an electronic throttle valve, a fuel injection device, an ignition device, and a wastegate valve provided in the vehicle 300, by an electronic control unit 318 to be described later. The engine 302 is not mechanically connected to drive wheels 310.

The generator 304 is a rotating electric machine having a function exclusively as a generator. The generator 304 is mechanically connected to the engine 302 and is a rotating machine to which the power of the engine 302 is transmitted. The generator 304 is driven to rotate by the engine 302 to generate power by the power of the engine 302. The generator 304 is a rotating machine capable of controlling the engine speed Ne of the engine, that is, a rotating machine capable of adjusting the engine speed Ne of the engine. The motor 306 is a rotating electric machine having a function as an electric motor and a function as a generator, and is a so-called motor generator. The motor 306 is a rotating machine connected to drive wheels 310 through a power transmission device 308 to transmit power. The generator 304 and the motor 306 are each connected to a battery 316 provided in the vehicle 300 through an inverter 314 provided in the vehicle 300. The generator 304 and the motor 306 are each controlled by the electronic control unit 318 controlling the inverter 314, which, in turn, the generator torque Tgr as the output torque of the generator 304 and the motor torque Tmt as the output torque of the motor 306 are controlled. The battery 316 is charged with the generated electric power Wgr of the generator 304, or the motor 306 consumes the power Wgr. The motor 306 outputs the motor torque Tmt by using all or some of the generated power Wgr or by using the power from the battery 316 in addition to the generated electric power Wgr. Thus, the motor 306 is driven by the generated electric power Wgr of the generator 304.

The vehicle 300 further includes an electronic control unit 318 as a controller including a control device of the vehicle 300 related to control of the engine 302, the generator 304, the motor 306, and the like. The electronic control unit 318 has the same configuration as the electronic control unit 100 shown in the first embodiment. Various signals and the like, which are similar to those supplied to the electronic control unit 100, are supplied to the electronic control unit 318. From the electronic control unit 318, various command signals, which are similar to those output by the electronic control unit 100, are output. The electronic control unit 318 has functions equivalent to the respective functions of the hybrid controller 102 and the state determination unit 104 included in the electronic control unit 100. The electronic control unit 318 can implement a control function for appropriately suppressing vibration generated in the vehicle 10 when the engine 12 is being brought to a stop, which is similar to the achievement by the electronic control unit 100 as described in the above first embodiment.

Specifically, when the engine 302 is being brought to a stop, the electronic control unit 318 can stop the fuel supply to the engine 302, and control the generator torque Tgr such that the torque for decreasing the engine speed Ne of the engine is applied to the engine 302. When the engine 302 is being brought to a stop, the electronic control unit 318 increases the generator torque Tgr at the time of decreasing the engine speed Ne of the engine when the turbocharging pressure Pchg is higher than when the turbocharging pressure Pchg is lower.

According to the embodiment, the same effects as in the above first embodiment can be obtained.

Although the embodiments of the disclosure have been described in detail with reference to the drawings, the present disclosure is applicable to other modes.

For example, in the above-described embodiments, the feedforward control amount for correcting the MG1 torque command value Tgc according to the turbocharging pressure Pchg shown in the third term of the right side of the equation (1) is added to the feedback control amount for following the target engine speed Netgt shown in the first and second terms on the right side of the equation (1) to calculate the MG1 torque command value Tgc at the time of the engine stop control, but the present disclosure is not limited to this mode. For example, a feedforward control amount for decreasing the engine speed Ne, for example, an MG1 torque Tg corresponding to the engine speed Ne may be used as a basic torque, and a feedforward control amount for correcting the MG1 torque command value Tgc according to the turbocharging pressure Pchg may be added to the basic torque to calculate the MG1 torque command value Tgc at the time of the engine stop control. Even in this case, the MG1 torque Tg at the time of decreasing the engine speed Ne can be made larger when the turbocharging pressure Pchg is higher than when the turbocharging pressure Pchg is lower.

Further, in the first embodiment described above, the vehicle 10 may be a vehicle in which the transmission unit 58 is not provided and the engine 12 is connected to the differential unit 60, like the vehicle 200. The differential unit 60 may be a mechanism capable of limiting a differential operation by controlling a clutch or a brake connected to a rotating element of the second planetary gear mechanism 82. The second planetary gear mechanism 82 may be a double pinion type planetary gear device. Further, the second planetary gear mechanism 82 may be a differential mechanism in which a plurality of planetary gear devices is connected to each other to have four or more rotating elements. The second planetary gear mechanism 82 may be a differential gear device in which the first rotating machine MG1 and the drive gear 74 are respectively connected to a pinion that is driven to rotate by the engine 12 and a pair of bevel gears that mesh with the pinion. The second planetary gear mechanism 82 may be a mechanism which has a configuration in which two or more planetary gear devices are connected to each other by some of the rotating elements constituting the planetary gear mechanisms, and the engine, the rotating machine, and the drive wheels are connected to the rotating elements of the planetary gear devices to transmit power.

Further, in the above-described second embodiment, the one-way clutch F0 is exemplified as the lock mechanism capable of fixing the carrier CA0 in a non-rotatable state, but the present disclosure is not limited to this mode. This lock mechanism may be an engagement device such as a meshing type clutch, a hydraulic friction engagement device such as a clutch and a brake, a dry engagement device, an electromagnetic friction engagement device, a magnetic powder clutch, for example, for selectively connecting the connection shaft 226 and the case 214. Alternatively, the vehicle 200 does not necessarily need to include the one-way clutch F0.

Further, in the above-described second embodiment, the stepped transmission unit 218 is exemplified as the automatic transmission that forms a part of the power transmission path between the differential mechanism 230 and the drive wheels 206, but the present disclosure is not limited to this mode. The automatic transmission may be, for example, a synchronous meshing parallel two-shaft type automatic transmission, a well-known dual clutch transmission (DCT) that is the synchronous meshing parallel two-shaft type automatic transmission and has two systems of input shafts, and a well-known belt-type continuously variable transmission.

Further, in the above-described third embodiment, in the vehicle 300, the engine 302 is not mechanically connected to the drive wheels 310, but is not limited to this mode. For example, in the vehicle 300, the engine 302 and the drive wheels 310 are connected through a clutch. For example, the clutch may be engaged during high-speed traveling to mechanically transmit the power of the engine 302 to the drive wheels 310. Further, the power transmission device 308 may include an automatic transmission.

Further, in the above-described embodiments, a mechanical pump type turbocharger that is driven to rotate by an engine or an electric motor may be provided in addition to or instead of the exhaust turbine type turbocharger 18. Alternatively, the turbocharger 18 may include an actuator capable of controlling the rotation speed of the compressor 18c, for example, an electric motor.

It should be noted that the above description is merely an embodiment, and that the present disclosure can be implemented in various modified and improved forms based on the knowledge of those skilled in the art.

What is claimed is:

1. A control device for a hybrid vehicle including an engine with a turbocharger and a rotating machine that is able to adjust an engine speed of the engine, the control device comprising an engine stop controller configured to stop fuel supply to the engine and control an output torque of the rotating machine to apply a torque for reducing the engine speed of the engine to the engine, when the engine is being brought to a stop,
   wherein the engine stop controller is configured to make the output torque of the rotating machine at a time of decreasing the engine speed of the engine larger when a turbocharging pressure by the turbocharger is higher than when the turbocharging pressure is lower.

2. The control device according to claim 1, wherein the engine stop controller is configured to make the output torque of the rotating machine at the time of decreasing the engine speed of the engine larger as the turbocharging pressure increases.

3. The control device according to claim 1, wherein, the engine stop controller is configured to, at the time of decreasing the engine speed of the engine, control the output torque of the rotating machine based on a feedback control amount by feedback control that controls the output torque of the rotating machine such that the engine speed of the engine becomes a target engine speed gradually reducing toward zero, and a feedforward control amount of the output torque of the rotating machine that is made larger when the turbocharging pressure is higher than the turbocharging pressure is lower.

4. The control device according to claim 3, wherein the engine stop controller is configured to correct a feedback gain in the feedback control by learning control based on a deviation between a value of a stop transition time at a current control and a target value of the stop transition time to make a value of the stop transition time at a next control close to the target value, the stop transition time being a time from a starting time point of a control for stopping the engine to a time point when the engine is stopped.

5. The control device according to claim 3, wherein the engine stop controller is configured to correct the feedforward control amount by learning control based on a deviation between a value of a stop transition time at a current control and a target value of the stop transition time to make a value of the stop transition time at a next control close to the target value, the stop transition time being a time from a starting time point of a control for stopping the engine to a time point when the engine is stopped.

6. The control device according to claim 1, wherein the engine stop controller is configured to estimate the turbocharging pressure when the engine is being brought to a stop, based on a detection value obtained by a sensor that detects the turbocharging pressure obtained at a starting time point of a control for stopping the engine and an elapsed time from the starting time point of the control for stopping the engine.

7. The control device according to claim 1, wherein the hybrid vehicle includes a differential mechanism that splits power of the engine to transmit the power to drive wheels and the rotating machine.

* * * * *